US00RE44927E

(19) United States
(12) Reissued Patent
Tirkkonen et al.

(10) Patent Number: US RE44,927 E
(45) Date of Reissued Patent: Jun. 3, 2014

(54) TRANSMISSION FORMAT INDICATION AND FEEDBACK IN MULTI-CARRIER WIRELESS COMMUNICATION SYSTEMS

(75) Inventors: Olav Tirkkonen, Helsinki (FI); Paolo Priotti, Tokyo (JP); Ulrico Celentano, Oulu (FI)

(73) Assignee: Nokia Corporation, Espoo (FI)

(21) Appl. No.: 13/352,388

(22) Filed: Jan. 18, 2012

Related U.S. Patent Documents

Reissue of:
(64) Patent No.: 7,649,959
Issued: Jan. 19, 2010
Appl. No.: 11/226,502
Filed: Sep. 14, 2005

U.S. Applications:
(60) Provisional application No. 60/613,832, filed on Sep. 27, 2004.

(51) Int. Cl.
*H04L 27/00* (2006.01)

(52) U.S. Cl.
USPC ..... 375/295; 375/232; 375/233; 375/261; 375/279; 375/298; 375/308

(58) Field of Classification Search
USPC ..... 375/295, 232, 233, 261, 279, 298, 308
See application file for complete search history.

(56) References Cited

U.S. PATENT DOCUMENTS

| | | | | |
|---|---|---|---|---|
| 6,701,129 | B1 | 3/2004 | Hashem et al. | 455/67.11 |
| 6,721,569 | B1 | 4/2004 | Hashem et al. | 455/450 |
| 7,336,683 | B1 * | 2/2008 | Eidson et al. | 370/479 |
| 2002/0173312 | A1 | 11/2002 | Takano et al. | 455/452 |
| 2003/0100267 | A1 * | 5/2003 | Itoh et al. | 455/69 |
| 2003/0161412 | A1 | 8/2003 | Niida et al. | 375/299 |
| 2004/0132496 | A1 | 7/2004 | Kim et al. | 455/562.1 |
| 2004/0185788 | A1 | 9/2004 | Terry et al. | 455/67.11 |
| 2005/0090205 | A1 * | 4/2005 | Catreux-Erceg et al. | 455/78 |
| 2006/0209674 | A1 | 9/2006 | Chen et al. | 370/335 |

OTHER PUBLICATIONS

Feedback Information Reducing Method for Adaptable Dta Rate in Multi-User OFDM/FDD System, Jang et al., IEICE Trans. Commun., vol. E87-B, No. 9, Sep. 2004, pp. 2794-2797.

* cited by examiner

*Primary Examiner* — Kabir A Timory
(74) *Attorney, Agent, or Firm* — Harrington & Smith

(57) ABSTRACT

A method is provided for specifying a transmission mode for each signal portion of a multi-carrier signal transmitted between a first and second device. The method includes defining an adaptive modulation and coding set divided into a plurality of subsets, each of the plurality of subsets including a plurality of transmission modes for transmitting a signal portion. The method further includes selecting a transmission mode subset from the plurality of subsets for transmission of the multi-carrier signal from a first to a second device, selecting a signal portion transmission mode for each signal portion from the plurality of transmission modes of the selected transmission mode subset, defining semantic bits that indicate the selected transmission mode subset, defining an indicator bit for each signal portion indicating the selected sub-carrier transmission mode, and transmitting the semantic bits and the indicator bit for each signal portion from a first to a second device.

31 Claims, 24 Drawing Sheets

| Constellation | Constellation size | Bits per symbol |
|---|---|---|
| BPSK | 2 | 1 |
| QPSK | 4 | 2 |
| 16 QAM | 16 | 4 |
| 64 QAM | 64 | 6 |

FIG. 3

| Channel code | Rate | Effective rate | Additional puncturing |
|---|---|---|---|
| Turbo code | 1/5 | 1/5 | none |
| Turbo code | 1/5 | 1/3 | 5/3 |
| Zig-zag code | 1/2 | 1/2 | none |
| Zig-zag code | 1/2 | 2/3 | 4/3 |
| Zig-zag code | 1/2 | 3/4 | 3/2 |
| Zig-zag code | 1/2 | 4/5 | 8/5 |

FIG. 5

| Symbol rate | Modulation method | Constellation | Spectral efficiency | Spatial diversity | Frequency diversity | Total diversity |
|---|---|---|---|---|---|---|
| 1 | Single stream | 64 QAM | 6 | 1 | 1 | 1 |
| 1 | WH 2 | 16 QAM | 4 | 1 | 2 | 2 |
| 1 | Wh 4 | QPSK | 2 | 1 | 4 | 4 |
| 1 | Wh 8 | BPSK | 1 | 1 | 8 | 8 |
| 1 | STTD | 64 QAM | 6 | 2 | 1 | 2 |
| 1 | STTD | 16 QAM | 4 | 2 | 1 | 2 |
| 1 | WH 2 STTD | QPSK | 2 | 2 | 2 | 4 |
| 1 | Diag ABBA | QPSK | 2 | 4 | 1 | 4 |
| 1 | WH 4 STTD | BPSK | 1 | 2 | 4 | 8 |
| 1 | WH 2 Diag ABBA | BPSK | 1 | 4 | 2 | 8 |
| 2 | 2 vector | 64 QAM | 12 | 1 | 1 | 1 |
| 2 | Twist STTD | 16 QAM | 8 | 2 | 1 | 2 |
| 2 | WH 2 Twist STTD | QPSK | 4 | 2 | 2 | 4 |
| 2 | DSTTD | 16 QAM | 8 | 2 | 2 | 4 |
| 2 | DABBA | QPSK | 4 | 4 | 1 | 4 |
| 3 | 3 vector | 16 QAM | 12 | 1 | 1 | 1 |
| 3 | Triple ABBA | QPSK | 6 | 2 | 1 | 2 |
| 4 | 4 vector | 16 QAM | 16 | 1 | 1 | 1 |
| 4 | Double Twist STTD | QPSK | 8 | 2 | 1 | 2 |

FIG. 4

FIG. 6

| Subset Number | Matrix/Vector Modulation | Constellation | Channel Coding Option | Spectral Efficiency |
|---|---|---|---|---|
| 1 | WH--8<br>no trans | BPSK<br>none | turbo 1/5 | 0.07 |
| 2 | WH--8<br>no trans | BPSK<br>none | turbo 1/3 | 0.12 |
| 3 | WH--4<br>WH--8 | QPSK<br>BPSK | turbo 1/5 | 0.21 |
| 4 | WH--4<br>WH--8 | QPSK<br>BPSK | turbo 1/3 | 0.35 |
| 5 | WH--2<br>WH--4 | 16-QAM<br>QPSK | turbo 1/3 | 0.69 |
| 6 | WH-2<br>WH-4 | 16-QAM<br>QPSK | Zig-Zag 1/2 | 1.04 |
| 7 | WH-2<br>WH-4 | 16-QAM<br>QPSK | Zig-Zag 3/4 | 1.57 |
| 8 | SS<br>WH-2 | 64-QAM<br>16-QAM | Zig-Zag 1/2 | 1.74 |
| 9 | SS<br>WH-2 | 64-QAM<br>16-QAM | Zig-Zag 2/3 | 2.32 |
| 10 | SS<br>WH-2 | 64-QAM<br>16-QAM | Zig-Zag 4/5 | 2.78 |
| 11 | WH-4<br>no trans | QPSK<br>none | turbo 1/5 | 0.14 |
| 12 | WH-4<br>no trans | QPSK<br>none | turbo 1/3 | 0.23 |
| 13 | WH-2<br>WH-8 | 16-QAM<br>BPSK | turbo 1/5 | 0.35 |
| 14 | WH-2<br>WH-8 | 16-QAM<br>BPSK | turbo 1/3 | 0.58 |
| 15 | WH-2<br>WH-8 | 16-QAM<br>BPSK | Zig-Zag 1/2 | 0.87 |
| 16 | WH-2<br>WH-8 | 16-QAM<br>BPSK | Zig-Zag 2/3 | 1.16 |

FIG. 7

| Subset Number | Matrix/Vector Modulation | Constellation | Channel Coding Option | Spectral Efficiency |
|---|---|---|---|---|
| 1 | WH-4-STTD<br>no trans | BPSK<br>none | turbo 1/5 | 0.07 |
| 2 | WH-4-STTD<br>no trans | BPSK<br>none | turbo 1/3 | 0.12 |
| 3 | WH-2-STTD<br>WH-4-STTD | QPSK<br>BPSK | turbo 1/5 | 0.21 |
| 4 | WH-2-STTD<br>WH-4-STTD | QPSK<br>BPSK | turbo 1/3 | 0.35 |
| 5 | STTD<br>WH-2-STTD | 16-QAM<br>QPSK | turbo 1/3 | 0.69 |
| 6 | STTD<br>WH-2-STTD | 16-QAM<br>QPSK | Zig-Zag 1/2 | 1.04 |
| 7 | STTD<br>WH-2-STTD | 16-QAM<br>QPSK | Zig-Zag 3/4 | 1.57 |
| 8 | STTD<br>STTD | 64-QAM<br>16-QAM | Zig-Zag 1/2 | 1.74 |
| 9 | STTD<br>STTD | 64-QAM<br>16-QAM | Zig-Zag 2/3 | 2.32 |
| 10 | STTD<br>STTD | 64-QAM<br>16-QAM | Zig-Zag 4/5 | 2.78 |
| 11 | WH-2-STTD<br>no trans | QPSK<br>none | turbo 1/5 | 0.14 |
| 12 | WH-2-STTD<br>no trans | QPSK<br>none | turbo 1/3 | 0.23 |
| 13 | STTD<br>WH-4-STTD | 16-QAM<br>BPSK | turbo 1/5 | 0.35 |
| 14 | STTD<br>WH-4-STTD | 16-QAM<br>BPSK | turbo 1/3 | 0.58 |
| 15 | STTD<br>WH-4-STTD | 16-QAM<br>BPSK | Zig-Zag 1/2 | 0.87 |
| 16 | STTD<br>WH-4-STTD | 16-QAM<br>BPSK | Zig-Zag 2/3 | 1.16 |

FIG. 8

| Subset Number | Matrix/Vector Modulation | Constellation | Channel Coding Option | Spectral Efficiency |
|---|---|---|---|---|
| 1 | STTD<br>STTD | 64-QAM<br>16-QAM | Zig-Zag 1/2 | 1.74 |
| 2 | STTD<br>STTD | 64-QAM<br>16-QAM | Zig-Zag 2/3 | 2.32 |
| 3 | STTD<br>STTD | 64-QAM<br>16-QAM | Zig-Zag 4/5 | 2.78 |
| 4 | WH-2-diagABBA<br>no trans | BPSK<br>none | turbo 1/5 | 0.07 |
| 5 | WH-2-diagABBA<br>no trans | BPSK<br>none | turbo 1/3 | 0.12 |
| 6 | diagABBA<br>WH-2-diagABBA | QPSK<br>BPSK | turbo 1/5 | 0.21 |
| 7 | diagABBAWH-4<br>WH-2-diagABBA | QPSK<br>BPSK | turbo 1/3 | 0.35 |
| 8 | STTD<br>diagABBA | 16-QAM<br>QPSK | turbo 1/3 | 0.69 |
| 9 | STTD<br>diagABBA | 16-QAM<br>QPSK | Zig-Zag 1/2 | 1.04 |
| 10 | STTD<br>diagABBA | 16-QAM<br>QPSK | Zig-Zag 3/4 | 1.57 |
| 11 | diagABBA<br>no trans | QPSK<br>none | turbo 1/5 | 0.14 |
| 12 | diagABBA<br>no trans | QPSK<br>none | turbo 1/3 | 0.23 |
| 13 | STTD<br>WH-2-diagABBA | 16-QAM<br>BPSK | turbo 1/5 | 0.35 |
| 14 | STTD<br>WH-2-diagABBA | 16-QAM<br>BPSK | turbo 1/3 | 0.58 |
| 15 | STTD<br>WH-2-diagABBA | 16-QAM<br>BPSK | Zig-Zag 1/2 | 0.87 |
| 16 | STTD<br>WH-2-diagABBA | 16-QAM<br>BPSK | Zig-Zag 2/3 | 1.16 |

FIG. 9A

| Subset Number | Matrix/Vector Modulation | Constellation | Channel Coding Option | Spectral Efficiency |
|---|---|---|---|---|
| 1 | WH-8<br>no trans | BPSK<br>none | turbo 1/5 | 0.07 |
| 2 | WH-8<br>no trans | BPSK<br>none | turbo 1/3 | 0.12 |
| 3 | WH-4<br>WH-8 | QPSK<br>BPSK | turbo 1/5 | 0.21 |
| 4 | WH-4<br>WH-8 | QPSK<br>BPSK | turbo 1/3 | 0.35 |
| 5 | WH-2<br>WH-4 | 16-QAM<br>QPSK | turbo 1/3 | 0.69 |
| 6 | WH-2<br>WH-4 | 16-QAM<br>QPSK | Zig-Zag 1/2 | 1.04 |
| 7 | WH-2<br>WH-4 | 16-QAM<br>QPSK | Zig-Zag 3/4 | 1.57 |
| 8 | SS<br>WH-2 | 64-QAM<br>16-QAM | Zig-Zag 1/2 | 1.74 |
| 9 | SS<br>WH-2 | 64-QAM<br>16-QAM | Zig-Zag 2/3 | 2.32 |
| 10 | SS<br>WH-2 | 64-QAM<br>16-QAM | Zig-Zag 4/5 | 2.78 |
| 11 | WH-4<br>no trans | QPSK<br>none | turbo 1/5 | 0.14 |
| 12 | WH-4<br>no trans | QPSK<br>none | turbo 1/3 | 0.23 |
| 13 | WH-2<br>WH-8 | 16-QAM<br>BPSK | turbo 1/5 | 0.35 |
| 14 | WH-2<br>WH-8 | 16-QAM<br>BPSK | turbo 1/3 | 0.58 |
| 15 | WH-2<br>WH-8 | 16-QAM<br>BPSK | Zig-Zag 1/2 | 0.87 |
| 16 | WH-2<br>WH-8 | 16-QAM<br>BPSK | Zig-Zag 2/3 | 1.16 |
| 17 | WH-4-STTD<br>no trans | BPSK<br>none | turbo 1/5 | 0.07 |
| 18 | WH-4-STTD<br>no trans | BPSK<br>none | turbo 1/3 | 0.12 |
| 19 | WH-2-STTD<br>WH-4-STTD | QPSK<br>BPSK | turbo 1/5 | 0.21 |
| 20 | WH-2-STTD<br>WH-4-STTD | QPSK<br>BPSK | turbo 1/3 | 0.35 |
| 21 | STTD<br>WH-2-STTD | 16-QAM<br>QPSK | turbo 1/3 | 0.69 |

FIG. 9B

| | | | | |
|---|---|---|---|---|
| 22 | STTD<br>WH-2-STTD | 16-QAM<br>QPSK | Zig-Zag 1/2 | 1.04 |
| 23 | STTD<br>WH-2-STTD | 16-QAM<br>QPSK | Zig-Zag 3/4 | 1.57 |
| 24 | STTD<br>STTD | 64-QAM<br>16-QAM | Zig-Zag 1/2 | 1.74 |
| 25 | STTD<br>STTD | 64-QAM<br>16-QAM | Zig-Zag 2/3 | 2.32 |
| 26 | STTD<br>STTD | 64-QAM<br>16-QAM | Zig-Zag 4/5 | 2.78 |
| 27 | WH-2-STTD<br>no trans | QPSK<br>none | turbo 1/5 | 0.14 |
| 28 | WH-2-STTD<br>no trans | QPSK<br>none | turbo 1/3 | 0.23 |
| 29 | STTD<br>WH-4-STTD | 16-QAM<br>BPSK | turbo 1/5 | 0.35 |
| 30 | STTD<br>WH-4-STTD | 16-QAM<br>BPSK | turbo 1/3 | 0.58 |
| 31 | STTD<br>WH-4-STTD | 16-QAM<br>BPSK | Zig-Zag 1/2 | 0.87 |
| 32 | STTD<br>WH-4-STTD | 16-QAM<br>BPSK | Zig-Zag 2/3 | 1.16 |

FIG. 10A

| Subset Number | Matrix/Vector Modulation | Constellation | Channel Coding Option | Spectral Efficiency |
|---|---|---|---|---|
| 1 | WH-8<br>no trans | BPSK<br>none | turbo 1/5 | 0.07 |
| 2 | WH-8<br>no trans | BPSK<br>none | turbo 1/3 | 0.12 |
| 3 | WH-4<br>WH-8 | QPSK<br>BPSK | turbo 1/5 | 0.21 |
| 4 | WH-4<br>WH-8 | QPSK<br>BPSK | turbo 1/3 | 0.35 |
| 5 | WH-2<br>WH-4 | 16-QAM<br>QPSK | turbo 1/3 | 0.69 |
| 6 | WH-2<br>WH-4 | 16-QAM<br>QPSK | Zig-Zag 1/2 | 1.04 |
| 7 | WH-2<br>WH-4 | 16-QAM<br>QPSK | Zig-Zag 3/4 | 1.57 |
| 8 | SS<br>WH-2 | 64-QAM<br>16-QAM | Zig-Zag 1/2 | 1.74 |
| 9 | SS<br>WH-2 | 64-QAM<br>16-QAM | Zig-Zag 2/3 | 2.32 |
| 10 | SS<br>WH-2 | 64-QAM<br>16-QAM | Zig-Zag 4/5 | 2.78 |
| 11 | WH-4<br>no trans | QPSK<br>none | turbo 1/5 | 0.14 |
| 12 | WH-4<br>no trans | QPSK<br>none | turbo 1/3 | 0.23 |
| 13 | WH-2<br>WH-8 | 16-QAM<br>BPSK | turbo 1/5 | 0.35 |
| 14 | WH-2<br>WH-8 | 16-QAM<br>BPSK | turbo 1/3 | 0.58 |
| 15 | WH-2<br>WH-8 | 16-QAM<br>BPSK | Zig-Zag 1/2 | 0.87 |
| 16 | WH-2<br>WH-8 | 16-QAM<br>BPSK | Zig-Zag 2/3 | 1.16 |
| 17 | STTD<br>STTD | 64-QAM<br>16-QAM | Zig-Zag 1/2 | 1.74 |
| 18 | STTD<br>STTD | 64-QAM<br>16-QAM | Zig-Zag 2/3 | 2.32 |
| 19 | STTD<br>STTD | 64-QAM<br>16-QAM | Zig-Zag 4/5 | 2.78 |
| 20 | WH-2-diagABBA<br>no trans | BPSK<br>none | turbo 1/5 | 0.07 |
| 21 | WH-2-diagABBA<br>no trans | BPSK<br>none | turbo 1/3 | 0.12 |

FIG. 10B

| | | | | |
|---|---|---|---|---|
| 22 | diagABBA<br>WH-2-diagABBA | QPSK<br>BPSK | turbo 1/5 | 0.21 |
| 23 | diagABBAWH-4<br>WH-2-diagABBA | QPSK<br>BPSK | turbo 1/3 | 0.35 |
| 24 | STTD<br>diagABBA | 16-QAM<br>QPSK | turbo 1/3 | 0.69 |
| 25 | STTD<br>diagABBA | 16-QAM<br>QPSK | Zig-Zag 1/2 | 1.04 |
| 26 | STTD<br>diagABBA | 16-QAM<br>QPSK | Zig-Zag 3/4 | 1.57 |
| 27 | diagABBA<br>no trans | QPSK<br>none | turbo 1/5 | 0.14 |
| 28 | diagABBA<br>no trans | QPSK<br>none | turbo 1/3 | 0.23 |
| 29 | STTD<br>WH-2-diagABBA | 16-QAM<br>BPSK | turbo 1/5 | 0.35 |
| 30 | STTD<br>WH-2-diagABBA | 16-QAM<br>BPSK | turbo 1/3 | 0.58 |
| 31 | STTD<br>WH-2-diagABBA | 16-QAM<br>BPSK | Zig-Zag 1/2 | 0.87 |
| 32 | STTD<br>WH-2-diagABBA | 16-QAM<br>BPSK | Zig-Zag 2/3 | 1.16 |

FIG. 11A

| Subset Number | Matrix/Vector Modulation | Constellation | Channel Coding Option | Spectral Efficiency |
|---|---|---|---|---|
| 1 | WH-4-STTD<br>no trans | BPSK<br>none | turbo 1/5 | 0.07 |
| 2 | WH-4-STTD<br>no trans | BPSK<br>none | turbo 1/3 | 0.12 |
| 3 | WH-2-STTD<br>WH-4-STTD | QPSK<br>BPSK | turbo 1/5 | 0.21 |
| 4 | WH-2-STTD<br>WH-4-STTD | QPSK<br>BPSK | turbo 1/3 | 0.35 |
| 5 | STTD<br>WH-2-STTD | 16-QAM<br>QPSK | turbo 1/3 | 0.69 |
| 6 | STTD<br>WH-2-STTD | 16-QAM<br>QPSK | Zig-Zag 1/2 | 1.04 |
| 7 | STTD<br>WH-2-STTD | 16-QAM<br>QPSK | Zig-Zag 3/4 | 1.57 |
| 8 | STTD<br>STTD | 64-QAM<br>16-QAM | Zig-Zag 1/2 | 1.74 |
| 9 | STTD<br>STTD | 64-QAM<br>16-QAM | Zig-Zag 2/3 | 2.32 |
| 10 | STTD<br>STTD | 64-QAM<br>16-QAM | Zig-Zag 4/5 | 2.78 |
| 11 | WH-2-STTD<br>no trans | QPSK<br>none | turbo 1/5 | 0.14 |
| 12 | WH-2-STTD<br>no trans | QPSK<br>none | turbo 1/3 | 0.23 |
| 13 | STTD<br>WH-4-STTD | 16-QAM<br>BPSK | turbo 1/5 | 0.35 |
| 14 | STTD<br>WH-4-STTD | 16-QAM<br>BPSK | turbo 1/3 | 0.58 |
| 15 | STTD<br>WH-4-STTD | 16-QAM<br>BPSK | Zig-Zag 1/2 | 0.87 |
| 16 | STTD<br>WH-4-STTD | 16-QAM<br>BPSK | Zig-Zag 2/3 | 1.16 |
| 17 | WH-2-TwistSTTD<br>WH-2-STTD | QPSK<br>QPSK | turbo 1/3 | 0.69 |
| 18 | WH-2-TwistSTTD<br>WH-2-STTD | QPSK<br>QPSK | Zig-Zag 1/2 | 1.04 |
| 19 | WH-2-TwistSTTD<br>WH-2-STTD | QPSK<br>QPSK | Zig-Zag 2/3 | 1.39 |
| 20 | WH-2-TwistSTTD<br>WH-2-STTD | QPSK<br>QPSK | Zig-Zag 4/5 | 1.67 |
| 21 | TwistSTTD<br>STTD | 16-QAM<br>16-QAM | Zig-Zag 1/2 | 2.09 |

FIG. 11B

| | | | | |
|---|---|---|---|---|
| 22 | TwistSTTD<br>STTD | 16-QAM<br>16-QAM | Zig-Zag 2/3 | 2.78 |
| 23 | TwistSTTD<br>STTD | 16-QAM<br>16-QAM | Zig-Zag 4/5 | 3.34 |
| 24 | TwistSTTD<br>WH-2-TwistSTTD | 16-QAM<br>QPSK | Zig-Zag 1/2 | 2.09 |
| 25 | TwistSTTD<br>WH-2-TwistSTTD | 16-QAM<br>QPSK | Zig-Zag 2/3 | 2.78 |
| 26 | TwistSTTD<br>WH-2-TwistSTTD | 16-QAM<br>QPSK | Zig-Zag 4/5 | 3.34 |
| 27 | vector<br>STTD | 64-QAM<br>64-QAM | Zig-Zag 1/2 | 3.13 |
| 28 | vector<br>STTD | 64-QAM<br>64-QAM | Zig-Zag 2/3 | 4.17 |
| 29 | vector<br>STTD | 64-QAM<br>64-QAM | Zig-Zag 4/5 | 5.01 |
| 30 | vector<br>TwistSTTD | 64-QAM<br>16-QAM | Zig-Zag 1/2 | 3.48 |
| 31 | vector<br>TwistSTTD | 64-QAM<br>16-QAM | Zig-Zag 2/3 | 4.64 |
| 32 | vector<br>TwistSTTD | 64-QAM<br>16-QAM | Zig-Zag 4/5 | 5.57 |

FIG. 12A

| Subset Number | Matrix/Vector Modulation | Constellation | Channel Coding Option | Spectral Efficiency |
|---|---|---|---|---|
| 1 | STTD<br>STTD | 64-QAM<br>16-QAM | Zig-Zag 1/2 | 1.74 |
| 2 | STTD<br>STTD | 64-QAM<br>16-QAM | Zig-Zag 2/3 | 2.32 |
| 3 | STTD<br>STTD | 64-QAM<br>16-QAM | Zig-Zag 4/5 | 2.78 |
| 4 | WH-2-diagABBA<br>no trans | BPSK<br>none | turbo 1/5 | 0.07 |
| 5 | WH-2-diagABBA<br>no trans | BPSK<br>none | turbo 1/3 | 0.12 |
| 6 | diagABBA<br>WH-2-diagABBA | QPSK<br>BPSK | turbo 1/5 | 0.21 |
| 7 | diagABBAWH-4<br>WH-2-diagABBA | QPSK<br>BPSK | turbo 1/3 | 0.35 |
| 8 | STTD<br>diagABBA | 16-QAM<br>QPSK | turbo 1/3 | 0.69 |
| 9 | STTD<br>diagABBA | 16-QAM<br>QPSK | Zig-Zag 1/2 | 1.04 |
| 10 | STTD<br>diagABBA | 16-QAM<br>QPSK | Zig-Zag 3/4 | 1.57 |
| 11 | diagABBA<br>no trans | QPSK<br>none | turbo 1/5 | 0.14 |
| 12 | diagABBA<br>no trans | QPSK<br>none | turbo 1/3 | 0.23 |
| 13 | STTD<br>WH-2-diagABBA | 16-QAM<br>BPSK | turbo 1/5 | 0.35 |
| 14 | STTD<br>WH-2-diagABBA | 16-QAM<br>BPSK | turbo 1/3 | 0.58 |
| 15 | STTD<br>WH-2-diagABBA | 16-QAM<br>BPSK | Zig-Zag 1/2 | 0.87 |
| 16 | STTD<br>WH-2-diagABBA | 16-QAM<br>BPSK | Zig-Zag 2/3 | 1.16 |
| 17 | vector<br>STTD | 64-QAM<br>64-QAM | Zig-Zag 1/2 | 3.13 |
| 18 | vector<br>STTD | 64-QAM<br>64-QAM | Zig-Zag 2/3 | 4.17 |
| 19 | vector<br>STTD | 64-QAM<br>64-QAM | Zig-Zag 4/5 | 5.01 |
| 20 | DABBA<br>diagABBA | QPSK<br>QPSK | turbo 1/3 | 0.69 |
| 21 | DABBA<br>diagABBA | QPSK<br>QPSK | Zig-Zag 1/2 | 1.04 |

FIG. 12B

| | | | | |
|---|---|---|---|---|
| 22 | DABBA<br>diagABBA | QPSK<br>QPSK | Zig-Zag 2/3 | 1.39 |
| 23 | DABBA<br>diagABBA | QPSK<br>QPSK | Zig-Zag 4/5 | 1.67 |
| 24 | DSTTD<br>STTD | 16-QAM<br>16-QAM | Zig-Zag 1/2 | 2.09 |
| 25 | DSTTD<br>STTD | 16-QAM<br>16-QAM | Zig-Zag 2/3 | 2.78 |
| 26 | DSTTD<br>STTD | 16-QAM<br>16-QAM | Zig-Zag 4/5 | 3.34 |
| 27 | DSTTD<br>DABBA | 16-QAM<br>QPSK | Zig-Zag 1/2 | 2.09 |
| 28 | DSTTD<br>DABBA | 16-QAM<br>QPSK | Zig-Zag 2/3 | 2.78 |
| 29 | DSTTD<br>DABBA | 16-QAM<br>QPSK | Zig-Zag 4/5 | 3.34 |
| 30 | vector<br>DSTTD | 64-QAM<br>16-QAM | Zig-Zag 1/2 | 3.48 |
| 31 | vector<br>DSTTD | 64-QAM<br>16-QAM | Zig-Zag 2/3 | 4.64 |
| 32 | vector<br>DSTTD | 64-QAM<br>16-QAM | Zig-Zag 4/5 | 5.57 |

FIG. 13A

| Subset Number | Matrix/Vector Modulation | Constellation | Channel Coding Option | Spectral Efficiency |
|---|---|---|---|---|
| 1 | WH-8<br>no trans | BPSK<br>none | turbo 1/5 | 0.07 |
| 2 | WH-8<br>no trans | BPSK<br>none | turbo 1/3 | 0.12 |
| 3 | WH-4<br>WH-8 | QPSK<br>BPSK | turbo 1/5 | 0.21 |
| 4 | WH-4<br>WH-8 | QPSK<br>BPSK | turbo 1/3 | 0.35 |
| 5 | WH-2<br>WH-4 | 16-QAM<br>QPSK | turbo 1/3 | 0.69 |
| 6 | WH-2<br>WH-4 | 16-QAM<br>QPSK | Zig-Zag 1/2 | 1.04 |
| 7 | WH-2<br>WH-4 | 16-QAM<br>QPSK | Zig-Zag 3/4 | 1.57 |
| 8 | WH-2-diagABBA<br>no trans | BPSK<br>none | turbo 1/5 | 0.07 |
| 9 | WH-2-diagABBA<br>no trans | BPSK<br>none | turbo 1/3 | 0.12 |
| 10 | diagABBA<br>WH-2-diagABBA | QPSK<br>BPSK | turbo 1/5 | 0.21 |
| 11 | diagABBAWH-4<br>WH-2-diagABBA | QPSK<br>BPSK | turbo 1/3 | 0.35 |
| 12 | STTD<br>diagABBA | 16-QAM<br>QPSK | turbo 1/3 | 0.69 |
| 13 | STTD<br>diagABBA | 16-QAM<br>QPSK | Zig-Zag 1/2 | 1.04 |
| 14 | STTD<br>diagABBA | 16-QAM<br>QPSK | Zig-Zag 3/4 | 1.57 |
| 15 | diagABBA<br>no trans | QPSK<br>none | turbo 1/5 | 0.14 |
| 16 | diagABBA<br>no trans | QPSK<br>none | turbo 1/3 | 0.23 |
| 17 | STTD<br>WH-2-diagABBA | 16-QAM<br>BPSK | turbo 1/5 | 0.35 |
| 18 | STTD<br>WH-2-diagABBA | 16-QAM<br>BPSK | turbo 1/3 | 0.58 |
| 19 | STTD<br>WH-2-diagABBA | 16-QAM<br>BPSK | Zig-Zag 1/2 | 0.87 |
| 20 | STTD<br>WH-2-diagABBA | 16-QAM<br>BPSK | Zig-Zag 2/3 | 1.16 |
| 21 | WH-2-TwistSTTD<br>WH-2-STTD | QPSK<br>QPSK | turbo 1/3 | 0.69 |

FIG. 13B

| | | | | |
|---|---|---|---|---|
| 22 | WH-2-TwistSTTD<br>WH-2-STTD | QPSK<br>QPSK | Zig-Zag 1/2 | 1.04 |
| 23 | WH-2-TwistSTTD<br>WH-2-STTD | QPSK<br>QPSK | Zig-Zag 2/3 | 1.39 |
| 24 | WH-2-TwistSTTD<br>WH-2-STTD | QPSK<br>QPSK | Zig-Zag 4/5 | 1.67 |
| 25 | TwistSTTD<br>STTD | 16-QAM<br>16-QAM | Zig-Zag 1/2 | 2.09 |
| 26 | TwistSTTD<br>STTD | 16-QAM<br>16-QAM | Zig-Zag 2/3 | 2.78 |
| 27 | TwistSTTD<br>STTD | 16-QAM<br>16-QAM | Zig-Zag 4/5 | 3.34 |
| 28 | TwistSTTD<br>WH-2-TwistSTTD | 16-QAM<br>QPSK | Zig-Zag 1/2 | 2.09 |
| 29 | TwistSTTD<br>WH-2-TwistSTTD | 16-QAM<br>QPSK | Zig-Zag 2/3 | 2.78 |
| 30 | TwistSTTD<br>WH-2-TwistSTTD | 16-QAM<br>QPSK | Zig-Zag 4/5 | 3.34 |
| 31 | vector<br>STTD | 64-QAM<br>64-QAM | Zig-Zag 1/2 | 3.13 |
| 32 | vector<br>STTD | 64-QAM<br>64-QAM | Zig-Zag 2/3 | 4.17 |
| 33 | vector<br>STTD | 64-QAM<br>64-QAM | Zig-Zag 4/5 | 5.01 |
| 34 | vector<br>TwistSTTD | 64-QAM<br>16-QAM | Zig-Zag 1/2 | 3.48 |
| 35 | vector<br>TwistSTTD | 64-QAM<br>16-QAM | Zig-Zag 2/3 | 4.64 |
| 36 | vector<br>TwistSTTD | 64-QAM<br>16-QAM | Zig-Zag 4/5 | 5.57 |
| 37 | DABBA<br>diagABBA | QPSK<br>QPSK | turbo 1/3 | 0.69 |
| 38 | DABBA<br>diagABBA | QPSK<br>QPSK | Zig-Zag 1/2 | 1.04 |
| 39 | DABBA<br>diagABBA | QPSK<br>QPSK | Zig-Zag 2/3 | 1.39 |
| 40 | DABBA<br>diagABBA | QPSK<br>QPSK | Zig-Zag 4/5 | 1.67 |
| 41 | DSTTD<br>STTD | 16-QAM<br>16-QAM | Zig-Zag 1/2 | 2.09 |
| 42 | DSTTD<br>STTD | 16-QAM<br>16-QAM | Zig-Zag 2/3 | 2.78 |
| 43 | DSTTD<br>STTD | 16-QAM<br>16-QAM | Zig-Zag 4/5 | 3.34 |
| 44 | DSTTD<br>DABBA | 16-QAM<br>QPSK | Zig-Zag 1/2 | 2.09 |

FIG. 13C

| | | | | |
|---|---|---|---|---|
| 45 | DSTTD<br>DABBA | 16-QAM<br>QPSK | Zig-Zag 2/3 | 2.78 |
| 46 | DSTTD<br>DABBA | 16-QAM<br>QPSK | Zig-Zag 4/5 | 3.34 |
| 47 | vector<br>DSTTD | 64-QAM<br>16-QAM | Zig-Zag 1/2 | 3.48 |
| 48 | vector<br>DSTTD | 64-QAM<br>16-QAM | Zig-Zag 2/3 | 4.64 |
| 49 | vector<br>DSTTD | 64-QAM<br>16-QAM | Zig-Zag 4/5 | 5.57 |
| 50 | TripABBA<br>WH-2-TwistSTTD | QPSK<br>QPSK | Zig-Zag 2/3 | 2.32 |
| 51 | TripABBA<br>WH-2-TwistSTTD | QPSK<br>QPSK | Zig-Zag 4/5 | 2.78 |
| 52 | 3vector<br>TripABBA | 16-QAM<br>QPSK | Zig-Zag 2/3 | 4.17 |
| 53 | 3vector<br>TripABBA | 16-QAM<br>QPSK | Zig-Zag 4/5 | 5.01 |
| 54 | 3vector<br>TwistSTTD | 16-QAM<br>16-QAM | Zig-Zag 2/3 | 4.64 |
| 55 | 3vector<br>TwistSTTD | 16-QAM<br>16-QAM | Zig-Zag 4/5 | 5.57 |
| 56 | Double TwistSTTD<br>DABBA | QPSK<br>QPSK | Zig-Zag 2/3 | 2.78 |
| 57 | Double TwistSTTD<br>DABBA | QPSK<br>QPSK | Zig-Zag 4/5 | 3.34 |
| 58 | Double TwistSTTD<br>DABBA | QPSK<br>QPSK | Zig-Zag 2/3 | 3.25 |
| 59 | Double TwistSTTD<br>DABBA | QPSK<br>QPSK | Zig-Zag 4/5 | 3.90 |
| 60 | 4vector<br>Double TwistSTTD | 16-QAM<br>QPSK | Zig-Zag 2/3 | 5.56 |
| 61 | 4vector<br>Double TwistSTTD | 16-QAM<br>QPSK | Zig-Zag 4/5 | 6.68 |
| 62 | 4vector<br>TwistSTTD | 16-QAM<br>16-QAM | Zig-Zag 2/3 | 5.56 |
| 63 | 4vector<br>TwistSTTD | 16-QAM<br>16-QAM | Zig-Zag 4/5 | 6.68 |
| 64 | 4vector<br>3vector | 16-QAM<br>16-QAM | Zig-Zag 2/3 | 6.50 |
| 65 | 4vector<br>3vector | 16-QAM<br>16-QAM | Zig-Zag 4/5 | 7.80 |

| Mode | Constellation | Constellation Size | Channel Coding Option |
|---|---|---|---|
| 1 | - | - | none |
| 2 | BPSK | 2 | Zig-Zag 1/2 |
| 3 | QPSK | 4 | Zig-Zag 1/2 |
| 4 | 8QAM | 8 | Zig-Zag 1/2 |
| 5 | 16QAM | 16 | Zig-Zag 1/2 |

FIG. 14

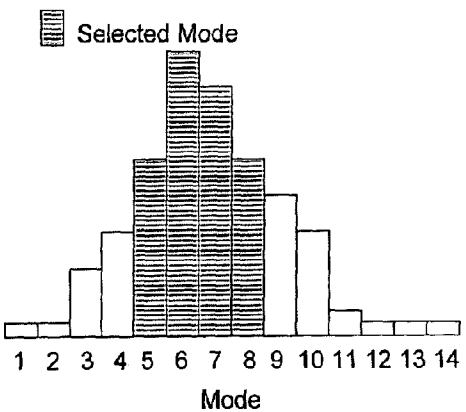
FIG. 18
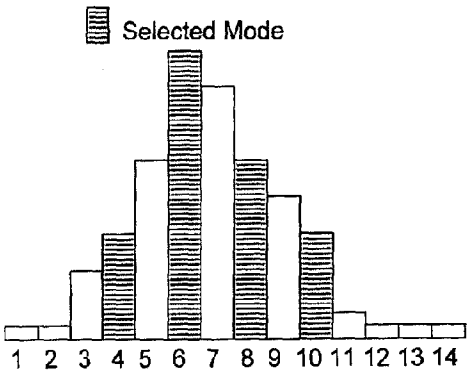
FIG. 19
FIG. 17
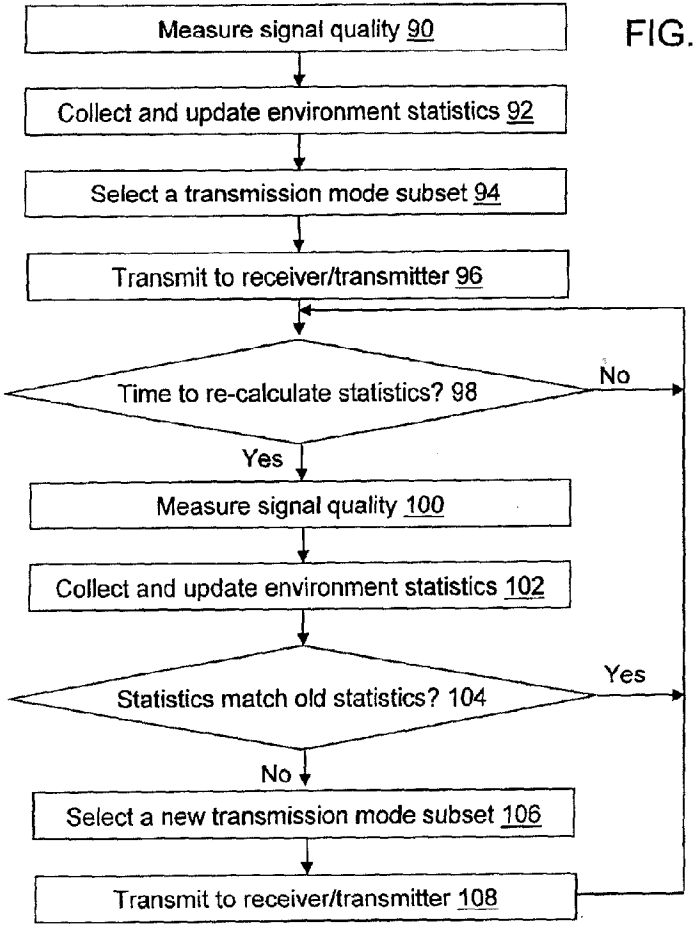

TRANSMISSION FORMAT INDICATION AND FEEDBACK IN MULTI-CARRIER WIRELESS COMMUNICATION SYSTEMS

Matter enclosed in heavy brackets [ ] appears in the original patent but forms no part of this reissue specification; matter printed in italics indicates the additions made by reissue.

*RELATED APPLICATIONS*

*This application is a Reissue of U.S. application Ser. No. 11/226,502 filed on Sep. 14, 2005 which was patented on Jan. 19, 2010 as U.S. Pat. No. 7,649,959 and which claims priority to U.S. Provisional Application No. 60/613,832 filed on Sep. 27, 2004, which is hereby incorporated by reference in its entirety.*

FIELD OF THE INVENTION

The present invention is related to wireless communication systems employing, for example, multi-carrier modulation techniques. More specifically, the present invention relates to a transmission format indication and/or a feedback signal for a wideband multi-carrier system where the transmission characteristics are adapted for each sub-carrier or sub-carrier cluster.

BACKGROUND OF THE INVENTION

A common problem found in high speed communication systems is inter-symbol interference (ISI) that results from multipath propagation. Multipath propagation is caused when delayed copies of the same signal arrive at the receiver. Delayed signals result from signal reflections from both terrain features such as trees, hills, and/or mountains and objects such as people, vehicles, and/or buildings. Because the signal reflection travels along a longer path, the reflected signals take more time to reach the receiver. The resulting delayed copies of the signal interfere with each other and with the possible direct signal causing ISI. Multi-carrier communication methods overcome ISI by subdividing the allocated bandwidth into smaller frequency sub-bands or sub-carriers. At each sub-carrier (sub-band), the data is transmitted using long symbol durations compared to the time delay between reflected signals. As a result, the impact of ISI is reduced.

Multi-carrier communication is proposed for the further evolution of third generation (3G) wireless systems including Evolved Universal Terrestrial Radio Access Network (EUTRAN), IEEE802.15.3a systems with MB-OFDM, fourth generation (4G) wireless systems, non-cellular communication systems, and short range communication systems based on multi-carrier modulation. Orthogonal Frequency Division Multiplexing (OFDM) is an implementation of a multi-carrier communication system in which the frequency sub-bands overlap. In an OFDM system, various modulation schemes may be used to modulate the data onto each sub-carrier. The incoming serial data is first converted from serial to parallel and grouped into "x" bits each to form a complex number. The number "x" determines a constellation of the corresponding sub-carrier. In communications terminology, a constellation is a pattern that represents the possible states of a carrier wave, each of which is associated with a particular bit combination. A constellation shows the number of states that can be recognized as unique changes in a communications signal, and thus represents the maximum number of bits that can be encoded in a single change. The modulation scheme in an OFDM system can be selected based on the requirement of power or of spectrum efficiency or based on other transmission considerations. For example, Binary Phase-Shift Keying (BPSK), Quadrature Phase-Shift Keying (QPSK), 16 Quadrature Amplitude Modulation (QAM), 32 QAM modulation methods may be used for a sub-carrier modulation. Error correction coding may also be applied to each sub-carrier.

Transmission parameters generally are constrained by an acceptable bit error rate and by a Signal to Interference plus Noise Ratio (SINR) of the signal. To provide for higher data throughput in wireless communication systems, Adaptive Modulation and Coding (AMC) methods are used in which both the modulation complexity and channel coding complexity are varied in response to changing channel conditions. In some communication systems such as systems implementing High Speed Downlink Packet Access (HSDPA), a number of channelization codes can also be varied in response to changing channel conditions. Varying modulation complexity means varying the number of bits that are communicated per symbol where a given modulation complexity provides a constellation of symbols with each symbol used to convey a bit string. The greater the number of symbols in the constellation, the longer the bit string conveyed by each symbol. Varying the channel coding complexity means, for example, varying the amount of redundancy included in forward error correction of the data to be transmitted. Varying the number of channelization codes means changing the number of channels multiplexed together by use of a code tree. Thus, AMC provides for the selection of a modulation method (comprising a matrix or a vector modulation), a constellation, a coding rate, a number of channelization codes, and/or an error correction code for each sub-carrier or cluster of sub-carriers in a multi-carrier system to allow adjustment of the transmission parameters thereby accommodating for changes in the channel characteristics over time. Thus, if a change in channel characteristics results in a lower SINR, the modulation level may be reduced (for example, from 16-QAM to QPSK or QPSK to BPSK) or the coding rate may be improved (for example, from ⅓ to ⅕) to maintain an acceptable bit error rate.

An example communication system includes a base station that transmits a signal to a remote unit. In a communication system implementing AMC, the base station and the remote unit must be synchronized with respect to the transmission parameters. In a Transmission Format Indication (TFI) system, the base station determines the transmission format based on measurements and possibly on feedback from the remote unit concerning the signal quality. The format used may be indicated to the remote unit in a TFI field, for example, in a common channel or in a channel header. In a feedback system, the remote unit selects the suitable transmission formats for the signal transmission and feeds the information back to the base station.

In either a TFI system or a FeedBack (TFI/FB) system, the remote unit may determine a channel quality when the remote unit receives a frame of data, for example, based on the SINR of the channel. In a TFI system, the remote unit sends a signal back to the base station reporting the channel quality. Using the channel quality report received from the remote unit, the base station calculates a set of transmission parameters that the base station will use in its next transmission of data. However, the base station must first send the set of new transmission parameters to the remote unit using the previous transmission parameters. Alternatively, a separate communication channel, often referred to as a control channel, may be established between the base station and the remote unit, and the information related to the new transmission parameters is sent on this control channel. The parameters of the control channel may be predefined, or they may change according to the perceived channel quality The remote unit receives the set of new transmission parameters using the previous transmission parameters. The remote unit then synchronizes subsequent frames of data using the new or predefined transmission parameters. In a feedback system, the remote unit calculates a set of transmission parameters for the base station to use, or a limited set of channel quality measurements that the base station may use to determine transmission parameters to use, in its next transmission of data. The remote unit sends the set of new transmission parameters to the base station using a feedback channel. The base station sends subsequent signals using the set of new transmission parameters. The system may be defined in a way that the base station may choose to use the transmission parameters suggested by the remote unit directly, or the base station may select other transmission parameter, if e.g. the traffic flow or the kind of traffic would require a different kind of transmission than the remote unit has assumed when calculating the set of transmission parameters. In such case, a feedback system and TFI system are used simultaneously.

In a multi-carrier system, AMC provides for the adjustment of transmission parameters for each sub-carrier or cluster of sub-carriers. In communication systems employing many sub-carriers, such as those that employ OFDM, the channel quality may vary with the frequency of each sub-carrier. OFDM systems can use thousands of sub-carriers. As a result, the transmission of information describing the channel quality and the set of transmission parameters for each sub-carrier requires significant overhead that may result in an efficiency reduction. Additionally, the AMC set that includes the possible transmission modes may be large typically because there are multiple rates and/or modulation alternatives. For example, in Multiple Input Single Output (MISO) systems and in Multiple Input Multiple Output (MIMO) systems, there are additional alternatives that relate to diversity and spatial/code multiplexing options. Thus, with many coherence bandwidths and multiple transmission alternatives, the overhead from feedback signaling and/or TFI may become overwhelming. Thus, what is needed is an efficient method of specifying an AMC transmission mode for a multi-carrier communication signal transmitted between a first device and a second device.

SUMMARY OF THE INVENTION

An exemplary embodiment of the invention relates to a method for specifying a transmission mode for a multi-carrier communication signal transmitted between a first device and a second device. The method includes, but is not limited to, defining an adaptive modulation and coding (AMC) set, wherein the AMC set includes a plurality of transmission modes for a multi-carrier signal; dividing the AMC set into a plurality of subsets, wherein each of the plurality of subsets includes a plurality of transmission modes; defining a plurality of sub-carrier signals for the multi-carrier signal; selecting a transmission mode subset from the plurality of subsets for transmission of the multi-carrier signal from a first device to a second device; for each of the plurality of sub-carrier signals, selecting a sub-carrier transmission mode from the plurality of transmission modes of the selected transmission mode subset; defining semantic bits, the semantic bits including a plurality of bits that indicate the selected transmission mode subset; defining an indicator bit for each of the plurality of sub-carrier signals, the indicator bit indicating the selected sub-carrier transmission mode for a sub-carrier signal; and transmitting the semantic bits and the indicator bit for each of the plurality of sub-carrier signals from a first device to a second device. The semantic bits and the indicator bit for each of the plurality of sub-carrier signals specify a transmission mode for each of the plurality of sub-carrier signals of the multi-carrier signal.

Another exemplary embodiment of the invention relates to one or more computer-readable media having computer-readable instructions stored thereon that, upon execution by a processor, cause the processor to specify a transmission mode for a multi-carrier communication signal transmitted between a first device and a second device. The instructions are configured to select a transmission mode subset from a plurality of subsets defined for transmission of a multi-carrier signal having a plurality of sub-carrier signals, wherein each of the plurality of subsets includes a plurality of transmission modes for the multi-carrier signal; to select a sub-carrier transmission mode from the plurality of transmission modes of the selected transmission mode subset for each of the plurality of sub-carrier signals; to define semantic bits, the semantic bits including a plurality of bits that indicate the selected transmission mode subset; and to define an indicator bit for each of the plurality of sub-carrier signals, the indicator bit indicating the selected sub-carrier transmission mode for a sub-carrier signal. The semantic bits and the indicator bit for each of the plurality of sub-carrier signals are included in a transmission from a first device to a second device to specify a transmission mode for each of the plurality of sub-carrier signals of the multi-carrier signal.

Still another exemplary embodiment of the invention relates to a device for specifying a transmission mode for a multi-carrier communication signal transmitted between the device and a second device. The device includes, but is not limited to, a communication interface, a computer-readable instruction set, a memory, and a processor. The communication interface is configured to send a signal to the second device. The computer-readable instruction set is configured to select a transmission mode subset from a plurality of subsets defined for transmission of a multi-carrier signal having a plurality of sub-carrier signals, wherein each of the plurality of subsets includes a plurality of transmission modes for the multi-carrier signal; to select a sub-carrier transmission mode from the plurality of transmission modes of the selected transmission mode subset for each of the plurality of sub-carrier signals; to define semantic bits, the semantic bits including a plurality of bits that indicate the selected transmission mode subset; and to define an indicator bit for each of the plurality of sub-carrier signals, the indicator bit indicating the selected sub-carrier transmission mode for a sub-carrier signal. The semantic bits and the indicator bit for each of the plurality of sub-carrier signals are included in the signal to specify a transmission mode for each of the plurality of sub-carrier signals of the multi-carrier signal. The memory stores the computer-readable instruction set. The processor is coupled to the memory and to the communication interface and is configured to execute the computer-readable instruction set.

Still another exemplary embodiment of the invention relates to a system for specifying a transmission mode for a multi-carrier communication signal transmitted between a first device and a second device. The system includes, but is not limited to, a first device and a second device. The first device includes, but is not limited to, a first communication interface, a computer-readable instruction set, a memory, and a first processor. The first communication interface is configured to send a signal to the second device. The computer-readable instruction set is configured to select a transmission mode subset from a plurality of subsets defined for transmission of a multi-carrier signal having a plurality of sub-carrier signals, wherein each of the plurality of subsets includes a plurality of transmission modes for the multi-carrier signal; to select a sub-carrier transmission mode from the plurality of transmission modes of the selected transmission mode subset for each of the plurality of sub-carrier signals; to define semantic bits, the semantic bits including a plurality of bits that indicate the selected transmission mode subset; and to define an indicator bit for each of the plurality of sub-carrier signals, the indicator bit indicating the selected sub-carrier transmission mode for a sub-carrier signal. The semantic bits and the indicator bit for each of the plurality of sub-carrier signals are included in the signal to specify a transmission mode for each of the plurality of sub-carrier signals of the multi-carrier signal. The memory stores the computer-readable instruction set. The first processor is coupled to the memory and to the first communication interface and is configured to execute the computer-readable instruction set.

The second device includes, but is not limited to, a second communication interface and a second processor. The second communication interface is configured to receive the signal from the first device. The second processor is coupled to the second communication interface and is configured to synchronize communication with the first device using the semantic bits and the indicator bit for each of the plurality of sub-carrier signals included in the received signal.

Other principal features and advantages of the invention will become apparent to those skilled in the art upon review of the following drawings, the detailed description, and the appended claims.

BRIEF DESCRIPTION OF THE DRAWINGS

The preferred embodiments will hereafter be described with reference to the accompanying drawings, wherein like numerals will denote like elements.

FIG. 3 is a table of exemplary modulation constellations.

FIG. 4 is a table of exemplary matrix/vector modulation methods.

FIG. 5 is a table of exemplary error correction codes and effective rates.

FIG. 6 is a table of a first AMC set in accordance with an exemplary embodiment of the present invention.

FIG. 7 is a table of a second AMC set in accordance with an exemplary embodiment of the present invention.

FIG. 8 is a table of a third AMC set in accordance with an exemplary embodiment of the present invention.

FIGS. 9A and B are a table of a fourth AMC set in accordance with an exemplary embodiment of the present invention.

FIGS. 10A and B are a table of a fifth AMC set in accordance with an exemplary embodiment of the present invention.

FIGS. 11A and B are a table of a sixth AMC set in accordance with an exemplary embodiment of the present invention.

FIGS. 12A and B are a table of a seventh AMC set in accordance with an exemplary embodiment of the present invention.

FIGS. 13A, B and C are a table of an eighth AMC set in accordance with an exemplary embodiment of the present invention.

FIG. 14 is a table of a ninth AMC set in accordance with an exemplary embodiment of the present invention.

FIG. 17 is a flow diagram of operations associated with selecting a transmission mode for inclusion in a subset of an AMC set in accordance with an exemplary embodiment of the present invention.

FIG. 18 is a graph depicting mode selection without decimation between a lower mode and an upper mode.

FIG. 19 is a graph depicting mode selection with decimation using an even step size.

DETAILED DESCRIPTION OF THE PREFERRED EMBODIMENTS

The basic idea of AMC is to dynamically change the modulation and coding scheme as channel conditions change with time. A unique modulation and coding scheme defines a transmission mode. The determination of the appropriate transmission mode may be performed at the receiver of the signal and fed back to the transmitter or may be performed at the transmitter based on channel condition information or a mode selection sent to the transmitter from the receiver. In a multi-carrier system, the transmission mode may change dynamically for each sub-carrier signal of the multi-carrier signal. It should be noted that the scope of the present invention is not limited to AMC, but instead can be adapted to, and thus covers, any other system or method of changing transceiver parameters according to the characteristics of the operating environment and desired performance requirements.

Figure 1:
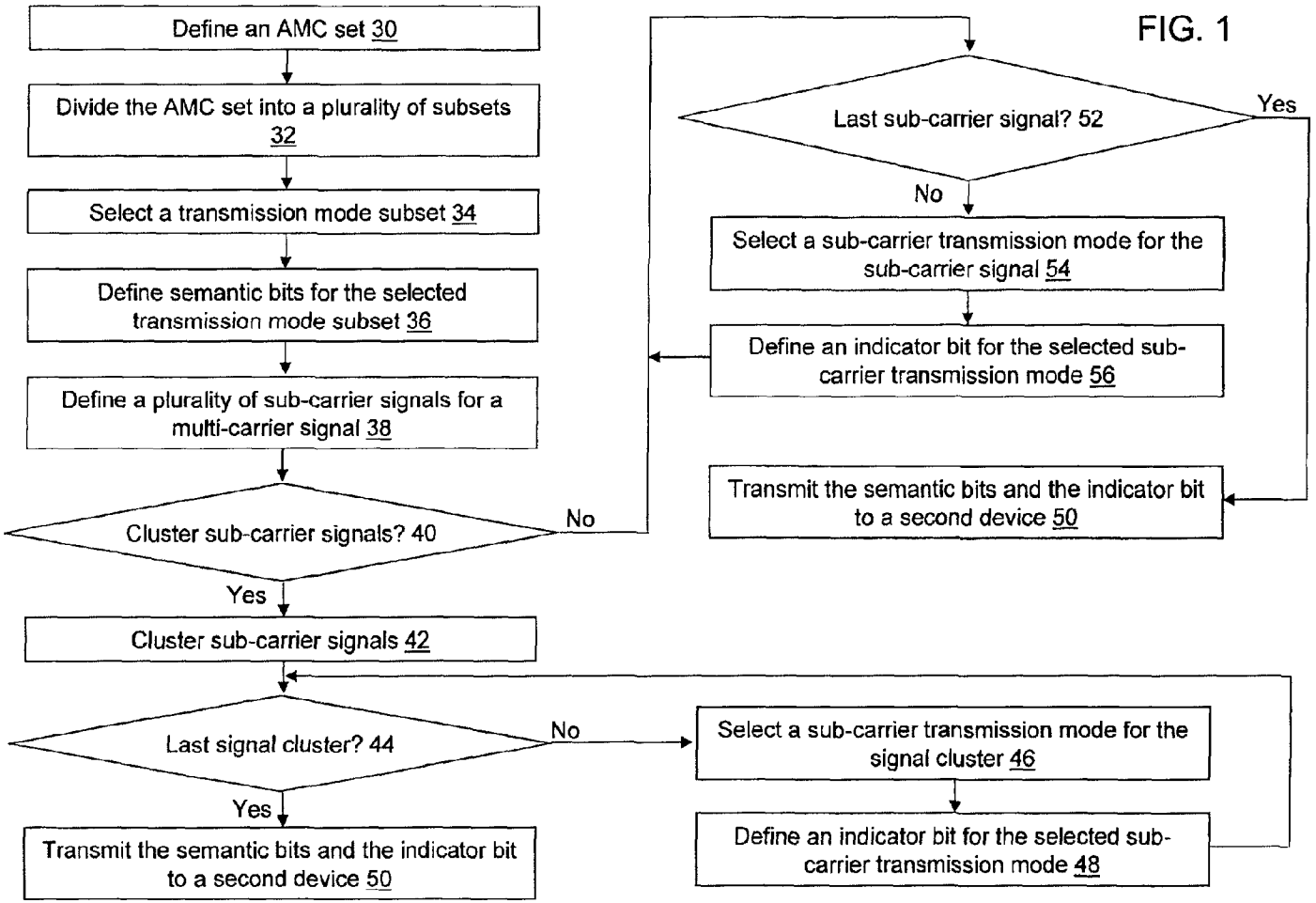
FIG. 1 is a flow diagram of operations associated with specifying a transmission mode for a multi-carrier, AMC communication system in accordance with an exemplary embodiment of the present invention.

With reference to the exemplary embodiment of FIG. 1, operations of a multi-carrier, AMC communication system are described. At an operation 30, an AMC set is defined to include the possible unique transmission modes that include the various modulation and coding schemes supported by a communication system configuration. At an operation 32, the AMC set is divided into a plurality of subsets that each include at least two transmission modes. The number of subsets may be large, and the subsets may overlap such that a single unique transmission mode may be included in multiple subsets. Preferably, there are only a few transmission modes in each subset of the AMC set. In an exemplary embodiment, two transmission modes are included in each subset. At an operation 34, a transmission mode subset is selected for the multi-carrier signal.

At an operation 36, semantic bits are defined for the selected transmission mode subset of operation 34. The number of semantic bits required depends on the number of subsets into which the AMC set is divided at the operation 32. For example, if there are twenty-one unique transmission modes, these may be divided into sixty-four subsets each having two transmission modes. Many, but not necessarily all of the unique transmission modes may be members of multiple subsets. Based on a need to select among sixty-four subsets, the length of the semantic bits is six bits in order to select one of the subsets. At an operation 38, a plurality of sub-carrier signals are defined for a multi-carrier signal.

A test at an operation 40, determines if the plurality of sub-carrier signals of the multi-carrier signal should be clustered. Because sub-carrier signals having adjacent frequencies usually exhibit similar channel qualities, a group of sub-carrier signals may be clustered together such that each uses the same transmission mode. Clustering thereby reduces the amount of overhead required in synchronizing the transmission mode of each sub-carrier between a transmitter and a receiver in a communication system. It a determination is made at the operation 40 to cluster the plurality of sub-carrier signals, the sub-carrier signals are clustered at an operation 42.

For each sub-carrier cluster, a sub-carrier transmission mode is selected from the transmission modes that make up the selected transmission mode subset. Thus, at an operation 44, a test determines if the cluster is the last signal cluster to be processed. If the cluster is not the last signal cluster, at an operation 46, a sub-carrier transmission mode is selected from the transmission modes that make up the selected transmission mode subset. For example, the sub-carrier transmission mode may be selected based on the average SINR of each sub-carrier included in the cluster. At an operation 48, an indicator bit is defined for the selected sub-carrier transmission mode of operation 46. The indicator bit may include more than one bit depending on the size of each subset. For example, if there are two transmission modes in each subset, the indicator bit may consist of only a single bit. Similarly, if four transmission modes are included in each subset, the indicator bit will consist of two bits. Processing continues at the operation 44 until an indicator bit is defined for each signal cluster. After processing each signal cluster, the defined semantic bits and indicator bit are transmitted to a second device to specify the transmission mode for each sub-carrier signal of the multi-carrier signal at an operation 50.

If a determination is made at the operation 40 not to cluster the plurality of sub-carrier signals, processing continues at an operation 52. At the operation 52, a test determines if the sub-carrier signal is the last sub-carrier signal to be processed. If the cluster is not the last sub-carrier signal, at an operation 54, a sub-carrier transmission mode is selected for the sub-carrier signal from the transmission modes that make up the selected transmission mode subset. At an operation 56, an indicator bit is defined for the selected sub-carrier transmission mode of operation 54. Processing continues at the operation 52 until an indicator bit is defined for each sub-carrier signal. After processing each sub-carrier signal, the defined semantic bits and indicator bit are transmitted to a second device to specify the transmission mode for each sub-carrier sianal of the multi-carrier signal at an operation 50.

For exemplification, the invention may be described in detail in the context of a multi-carrier system having a 20 MHz bandwidth. The maximum delay spread is taken to be 2 μs which gives a coherence bandwidth of 500 kHz. The coherence bandwidth is the average bandwidth between two consecutive fades in the frequency direction. A suitable size of a sub-carrier signal cluster has a total bandwidth less than the coherence bandwidth. Using additional clusters results in a more accurate adaptation, but the overhead due to TFI and/or feedback increases. If the clustering decision is performed at the transmitter based on measurements at the transmitter (for example, a time division duplexing system in a noise-limited scenario), total throughput may be maximized where TFI overhead is contrasted against an adaptation gain. In a scenario using feedback, it is difficult to determine an absolute metric for measuring overhead used. As a general rule, extensive feedback should be avoided.

Figure 22B:
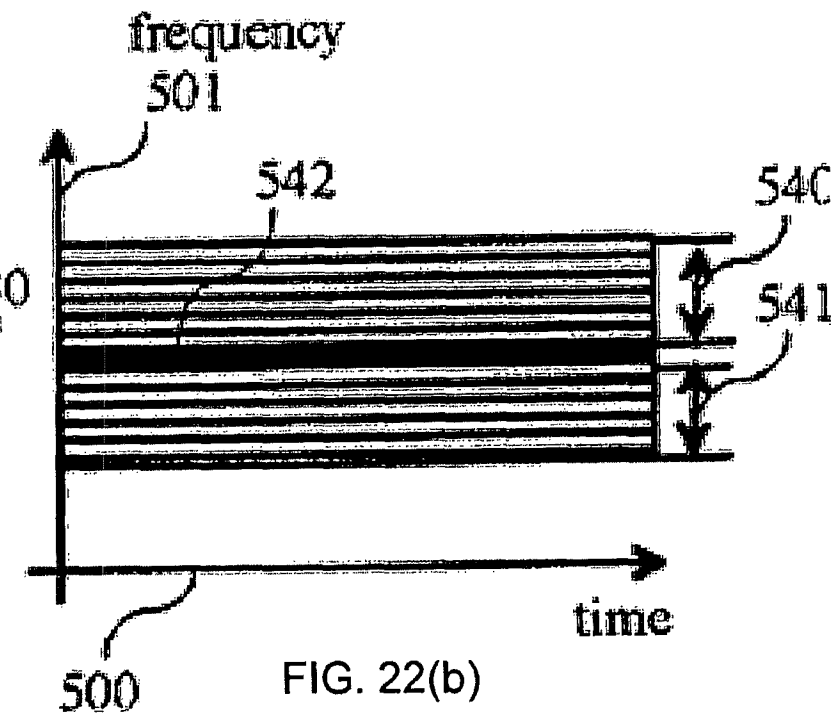
FIG. 22(b) is a graph illustrating a sub-carrier cluster punctured by a pilot tone according to one embodiment of the present invention.
Figure 22A:
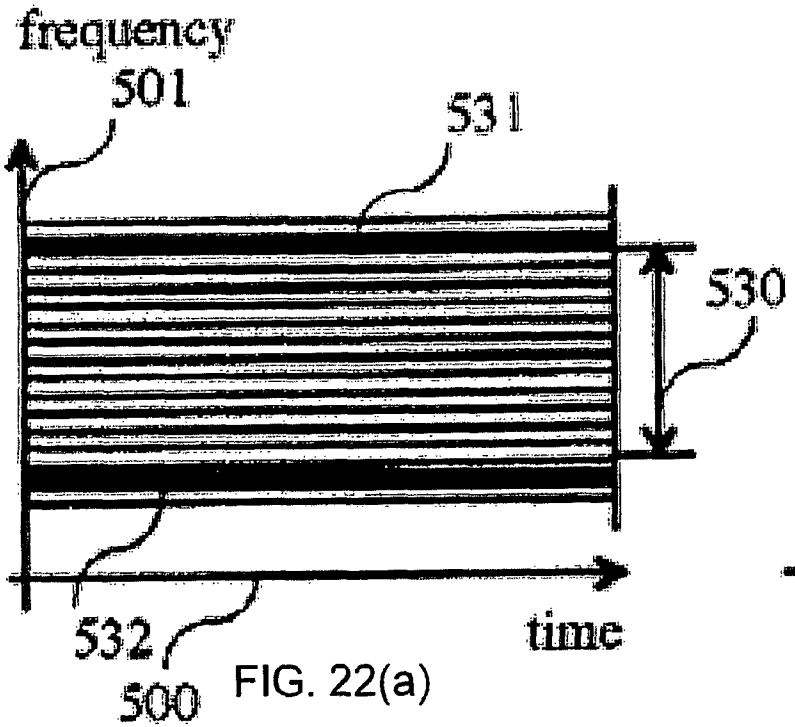
FIG. 22(a) is a graph illustrating a sub-carrier cluster between two pilot tones according to one embodiment of the present invention.

In an example situation, the duration of a symbol is 25.6 μs, and the cyclic prefix (guard interval) is taken to be 2 μs. The Transmission Time Interval (TTI) is the period of allocation during which the same user(s) are transmitted to using the same sub-carrier and the same transmission mode. In the exemplary embodiment, the TTI is 20 symbols resulting in a 0.552 ms TTI. The FFT size for a 20 MHz bandwidth signal is assumed to be 512 sub-carriers, of which 416 may be assumed to be active. Every 13th sub-carrier is a pilot tone. Thus, Thirty-two groups of 12 active sub-carriers plus a pilot result. The pilot may be inserted as the middlemost of the 13 sub-carriers or on the edge. In the latter case, there should be a pilot at both ends of the active bandwidth resulting in 417 active carriers. If staggered pilots are used, the pilots alternate from OFDM symbol to symbol. A sub-carrier cluster is a group of adjacent sub-carriers. When considering a sub-carrier cluster of 12 sub-carriers, a cluster may be sandwiched between two pilot tones, or it may be divided into two sub-clusters of, for example, 6 sub-carriers so that the sub-clusters have between them a pilot tone. FIG. 22(a) is a graph illustrating a sub-carrier cluster between two pilot tones in one embodiment of the invention. In FIG. 22(a), there are pilot tones 531-532 which have between them a cluster 530 of sub-carriers. FIG. 22(b) is a graph illustrating a sub-carrier cluster punctured by a pilot tone in one embodiment of the invention. In FIG. 22(b), there is a pilot tone 542, which is between sub-clusters 540 and 541. The placing of pilots alternates from symbol to symbol in time.

The sub-carrier bandwidth is ~40 kHz, and each cluster includes twelve sub-carriers between two pilot tones resulting in 480 kHz per cluster. Thus, there are Thirty-two clusters, and for each cluster, the chosen transmission mode must be indicated or fed back.

In an exemplary embodiment, a group of modulation constellations and a set of matrix/vector modulation methods are defined. For example, the constellations in FIG. 3 and the matrix/vector modulation methods in FIG. 4 may be used. With reference to FIG. 4, spreading in space means the degree of spatial/polarization transmit diversity sought after using the modulation. Spreading in frequency means the degree of Walsh-Hadamard (WH) spreading used. It is assumed that the remote unit and the base station have between one and four antennas though additional antennas may be used.

Regarding space-time or space-frequency, in the context of the preferred embodiment, it is preferable to extend transmission matrices in the temporal direction, at least for slowly moving users. In that case, a matrix modulator with, for example, fourth order spatial diversity may be a 4×4 matrix, where three dimensions represent the space and the fourth is time. Successive columns of this matrix are transmitted from the multiple antennas in successive symbols, and there may be five such matrices transmitted during the 20-symbol TTI. In this situation, there is a space-tiem/space/frequence (different sub-carriers) transmission, where x are transmitted on four different channels h according to the equation below. The channels vary in time, and there are four time instants represented by the columns in the channel matrix. Considering that there are 20 symbol TTI, there is time to send five such transmissions.

$$y = \begin{bmatrix} y_1 \\ y_2 \\ y_3 \\ y_4 \end{bmatrix} = \begin{bmatrix} h_1 & h_1 & h_1 & h_1 \\ h_2 & -h_2 & h_2 & -h_2 \\ h_3 & h_3 & -h_3 & -h_3 \\ h_4 & -h_4 & -h_4 & h_4 \end{bmatrix} \begin{bmatrix} x_1 \\ x_2 \\ x_3 \\ x_4 \end{bmatrix} + n \equiv \mathcal{H}x + n = \begin{bmatrix} h_1(x_1 + x_2 + x_3 + x_4) \\ h_2(x_1 - x_2 + x_3 - x_4) \\ h_3(x_1 + x_2 - x_3 - x_4) \\ h_4(x_1 - x_2 - x_3 + x_4) \end{bmatrix} + n.$$

Regarding spreading in frequency, it is preferable that the sub-carriers that a symbol is spread over are interleaved so that they are separated at least by a typical coherence bandwidth. In the exemplary embodiment with thirty-two clusters, using WH spreading 2, the clusters may be paired as {m, m+16}=1; : : : ; 16. In the exemplary embodiment with thirty-two clusters, using WH spreading 4, the clusters may be paired as {m, m+8, m+16, m+24}=1; : : : ; 8. Alternatively, the sub-carriers may be chosen adaptively.

With reference to FIG. 4, a preferred constellation is listed for a given matrix modulation method because a higher order constellation, a higher symbol rate, and a higher diversity degree all increase detection complexity separately. As a result, all three should not be adjusted simultaneously. Also, when WH spreading in frequency is considered, extensive spreading destroys the possibility of adapting the transmission rate to the channel state. With reference to FIG. 4, the total degree of (transmit) diversity, constructed by spatial and/or frequency matrix modulation, is at most eight for BPSK transmissions. The diversity is at most four for QPSK transmissions except for symbol rates 3 and 4 where the diversity is at most two. The diversity is at most two for 16-QAM transmissions except for symbol rates 3 and 4 where the diversity is one. For single stream 64-QAM transmissions, double spatial diversity may be used, but for higher rate 64-QAM transmissions, no diversity is used.

With reference to FIG. 5, a number of Forward Error Correction (FEC) options are listed. A single channel code of low rate that is then punctured may be used to construct a higher rate channel code. Improved performance results if multiple codes are used. Thus, both a low rate turbo code for rates up to ½ and a Low Density Parity Check code (LDPC) or Zig-Zag code for rates greater than or equal to ½ may be used. In an exemplary embodiment, there are six FEC options, as listed in FIG. 5.

In exemplary embodiments, for each user active during a TTI, one channel coding option is used and a set of two possible combinations of a matrix/vector modulation and a constellation. Possible AMC sets for different embodiments are shown with reference to FIGS. 6-13. In FIGS. 6-13, a subset number is defined for each subset that includes two transmission modes. For each transmission mode, a modulation method, a constellation, a channel coding option, and a spectral efficiency are reported. In addition, an average number of uncoded and information bits per TTI may be calculated with the assumption that either modulation in the set is applied on half of the sub-carriers, and one user occupies all sub-carriers and all symbols in the TTI.

The underlying principles of the selection of the exemplary AMC sets of FIGS. 6-13 are that low rate transmissions are used for low SINR situations and high order spatial/code multiplexing and high rate transmissions are used for high SINR situations. Low rate transmissions for low SINR situations are constructed by concatenating a small constellation size with a diversity method that provides for high diversity degree and for a low rate FEC code. This is effective because where the SINR is low, the expected throughput is small. Combining the smallest constellations with low rate codes results in throughputs of the expected order. A low code rate should be capable of extracting possible diversity gains from the channel. The interference experienced from neighboring cells, which dominates the performance at low SINR situations at cell edges, is whitened, however, by spreading and/or by spatial diversity transmission. In other words, for low rate transmissions, the load is expected to be less than 100%, and spreading gain is expected to occur. For reliable detection of non-orthogonal diversity methods such as frequency spreading with frequency interleaving, and spatial diversity with diversity order >2, a non-linear detector (i.e., M-algorithm, QRD-M, sphere) may be used. The complexity increases in the diversity degree (number of simultaneously detectable symbols) and constellation size. Because the demodulation complexity is low due to the small constellation size, part of the detection complexity may be used to detect diversity transmissions. Thus, frequency spreading and/or spatial diversity transmissions are used with small constellations, and the smaller the constellation, the more diversity may be strived for.

High rate transmissions for high SINR situations are constructed by concatenating a large constellation with a high rate code and low or no diversity. The logic is opposite to that discussed in the paragraph above. In particular, detection complexity prevents targeting for too much diversity in a high rate transmission. Because high rate modes are used with high rate codes at supposedly high SINR, diversity becomes especially valuable. Thus, some degree of diversity is sought. In an alternative selection of modes, more diversity in the high rate modes may be achieved using a simpler detector. To keep combined detection and decoding complexity low, rates lower than ½ are not used if instead the bits per constellation in all modes in an AMC set can be halved. High order spatial/code multiplexing and high rate codes are used for the same reasons.

In the exemplary embodiment, the mode selection using either TFI or feedback is reported with a suitable number of bits indicating the selected set. Thirty-two bits indicates the choice for each of the thirty-two clusters given two transmission modes in each subset. Using TFI of a downlink transmission where multiple users may be active during a TTI, the combination of users and clusters must also be indicated. For each active user, the selected set and the selected mode for each of the clusters reserved to the user is reported. The multiuser aspects are not considered here in more detail. A first exemplary AMC set for single stream sets that may be transmitted (and received) with a single antenna is tabulated in FIG. 6. This AMC set may be applicable, for example, in downlink (DL) macro cellular systems where there is one transmit antenna per sector or where there are effectively one transmit antenna per fixed beam, and the fixed beams construct spatially separate sectors or pseudo-sectors. If the fading dips in the frequency direction are deep (caused, for example, if the two strongest taps are almost of equal strength), the transmission mode may be selected from subsets 11-16 of FIG. 6. If, in the power delay profile, there are two strong taps which are almost of the same power, there will be deep fades on some frequencies. Then some clusters may be very bad, whereas most clusters are rather good. In this situation, one selects two modes that reflect this difference between the fading realizations of the clusters. These subsets are such that there is a large difference between the number of bits transmitted with the two transmission modes in the subset. Therefore, these subsets are suitable for cases where there are large differences between the fading realizations of the clusters. The semantic bits include four bits based on the selection among sixteen subsets. Thus, a total overhead of thirty-six (32+4) bits is required to select a transmission mode for the multi-carrier signal under these operating conditions.

A second exemplary AMC set for single stream sets that may be transmitted (and received) with two antennas is tabulated in FIG. 7. This AMC set may be applicable, for example, in DL if all base stations are equipped with at least two transmit antennas per sector. If the fading dips in the frequency direction are deep (caused, for example, if the two strongest taps are almost of equal strength), the transmission mode may be selected from subsets 11-16 of FIG. 7. The semantic bits include four bits based on the selection among sixteen subsets. Thus, a total overhead of thirty-six bits is required to select a transmission mode for the multi-carrier signal under these operating conditions.

A third exemplary AMC set for single streams that may be transmitted (and received) with four or two antenna transmissions is tabulated in FIG. 8. This AMC set may be applicable, for example, in DL if all base stations are equipped with at least four transmit antennas per sector. If the fading dips in the frequency direction are deep (caused, for example, if the two strongest taps are almost of equal strength), the transmission mode may be selected from subsets 11-16 of FIG. 8. The semantic bits include four bits based on the selection among sixteen subsets. Thus, a total overhead of thirty-six bits is required to select a transmission mode for the multi-carrier signal under these operating conditions.

A fourth exemplary AMC set for single streams that may be transmitted (and received) with one or two antenna transmissions is tabulated in FIG. 9. Either one-or two-antenna transmissions are used, but no assumption regarding the antenna configuration at the receiver is made, and all modes are single stream. This AMC set may be applicable, for example, in DL if all of the base stations are equipped with at least two transmit antennas per sector. The semantic bits include five bits based on the selection among thirty-two subsets. Thus, a total overhead of thirty-seven bits is required to select a transmission mode for the multi-carrier signal under these operating conditions. The fourth exemplary AMC set provides additional flexibility as compared to the second exemplary AMC set embodiment. Diversity may be achieved from the frequency dimension or from the spatial dimension.

A fifth exemplary AMC set for single streams that may be transmitted (and received) with four or two antenna transmissions is tabulated in FIG. 10. The semantic bits include five bits based on the selection among thirty-two subsets. Thus, a total overhead of thirty-seven bits is required to select a transmission mode for the multi-carrier signal under these operating conditions.

A sixth exemplary AMC set for dual streams that may be transmitted (and received) with one or two antenna transmissions is tabulated in FIG. 11. If the receiver has at least two receiving antennas (preferrably in orthogonal polarizations), dual stream sets may be used. The semantic bits include five bits based on the selection among thirty-two subsets. Thus, a total overhead of thirty-seven bits is required to select a transmission mode for the multi-carrier signal. With one additional bit added to the semantic bits, the sixteen single stream, single antenna transmission mode subsets of FIG. 6 may be added to the sixth exemplary AMC set, as well as sixteen additional sets, which may, for example, use different power allocation combinations. A total overhead of thirty-eight bits results under these operating conditions.

A seventh exemplary AMC set for dual streams that may be transmitted (and received) with four or two antenna transmissions is tabulated in FIG. 12. It is assumed that at least some receivers may have two receiving antennas and that dual streaming is possible. The semantic bits include five bits based on the selection among thirty-two subsets. Thus, a total overhead of thirty-seven bits is required to select a transmission mode for the multi-carrier signal. With one additional bit added to the semantic bits, the sixteen single stream, single antenna transmission mode subsets of FIG. 6 may be added to the AMC set, as well as sixteen additional sets, which may, for example use, different power allocation combinations. A total overhead of thirty-eight bits results under these operating conditions.

An eighth exemplary AMC set for quadruple streams that may be transmitted (and received) with four or two antenna transmissions is tabulated in FIG. 13. It is assumed that at least some receivers may have four receiving antennas and that quadruple streaming is possible. The semantic bits include six bits which makes it possible to select among at most sixty-four subsets. Thus, a total overhead of thirty-eight bits is required to select a transmission mode for the multi-carrier signal under these operating conditions.

In a feedback scenario, the rate of feedback is an important parameter. Assuming a carrier frequency of 2.5 GHz, the wavelength is 0.12 m. For a user moving with a speed of 3 km/h, this translates to a channel coherence time of 0.14 s. Assuming that feedback is sufficiently reliable for a latency time of up to 10% of the channel coherence time, the feedback rate required for the modes described above is on the order of 2700 bps. This is roughly twice the feedback rate used in Wideband Code Division Multiple Access (WCDMA) Transmit Adaptive Array (TxAA) transmit diversity modes. This rate may be realized either with a continuous transmission of a feedback channel (as in WCDMA) or by transmission of packets of feedback bits (preferably the semantic bits and indicator bits plus possibly some other control information and redundancy bits) at suitable intervals. Thus, all active (or potentially active) users may transmit a feedback packet, for example, every 10th ms.

If spreading in frequency is employed, for example, using WH spreading codes, symbols are spread over multiple sub-carriers. Thus, if subsets 1-10 of FIG. 6 are used, some symbols are spread over eight sub-carriers. To achieve the greatest diversity, these sub-carriers should be separated by at least the expected coherence bandwidth assuming frequency interleaving. There are two possible approaches, exemplified using subsets 1-10 of FIG. 6. First, use of predefined super clusters. Second, use of adaptive superclusters. Relative to predefined super clusters, if subset numbers 1-4 are chosen, the set of thirty-two clusters is divided, for example, into four superclusters that each include eight clusters. The four superclusters are interleaved so that the distance between clusters within the superclusters is maximized. Only four indicator bits are needed to indicate which of the two modes is used in each of the superclusters. As an example, the thirty-two clusters could be arranged into four super clusters A, B, C, and D as ABCDABCDABCDABCDABCDABCDABCDABCD.

If subset numbers 5-7 are used, there are eight superclusters that each include four clusters, and eight indicator bits are needed, whereas for subset numbers 8-10, sixteen indicator bits are needed. Thus, the number of indicator bits changes depending on the size of the chosen subset. If the total number of TFI/feedback bits is fixed, use of a stronger code or repetition increases redundancy because the error rate on the TFI/feedback channels likely correlates with the SINR, and thus, with the targeted spectral efficiency. As a result, the TFI/feedback of the lowest rate transmission receives the best protection.

Relative to adaptive superclusters, the superclusters may be defined based on the indicator bits of individual clusters. For each of the thirty-two clusters, the preferred mode is reported. The clusters are combined to superclusters using a predefined algorithm. Preferably, this algorithm maximizes the bandwidth between clusters in a supercluster. The simplest method is to make an ordered list of clusters employing a given mode, and dividing that into super clusters in a periodic manner. Consider, for example, using subset 1 in FIG. 6 where eight clusters are estimated to result in a sufficiently low SINR that it is better not to use them for transmission of the multi-carrier signal. As a result, twenty-four clusters (instead of the original thirty-two) are used for transmission with WH spreading 8. For example, an indicator sequence with indicator bit 0/1 when the first/second mode is selected, and denoting the "no transmission" clusters with N and the three WH 8 superclusters with A, B, C, the straight forward principle for super cluster construction explained above results in

| | | | | | | | | | | | | | | | |
|---|---|---|---|---|---|---|---|---|---|---|---|---|---|---|---|
| 0 | 0 | 1 | 0 | 0 | 1 | 0 | 0 | 0 | 0 | 1 | 0 | 0 | 1 | 0 | 0 |
| A | B | N | C | A | N | B | C | A | B | N | C | A | N | B | C |
| 1 | 1 | 1 | 1 | 0 | 0 | 0 | 0 | 0 | 0 | 0 | 0 | 0 | 0 | 0 | 0 |
| N | N | N | N | A | B | C | A | B | C | A | B | C | A | B | C |

Thus, the 24 clusters employing WH 8 are divided into three superclusters in a periodic manner.

The use of predefined super clusters is more robust against errors in TFI/feedback, whereas use of adaptive superclusters is capable of tracking the frequency response more exactly. Combinations of the two approaches may be used as well. Thus, for example, in the first embodiment of FIG. 6, the thirty-two clusters may be divided into sixteen pairs of clusters separated by fifteen clusters. The mode is reported for each pair of clusters. For modes with spreading 4 or 8, adaptive super clusters may be constructed of two or four pairs, generalizing the algorithm described above.

Above, it was assumed that maximum diversity is achieved using WH spreading. Given that the channel coding may be strong, diversity gains from explicit frequency spreading may be negligible. Whitening adjacent cell/sector interference (when load <100%) may provide gains, however, it is possible to achieve whitening gains without frequency interleaving. Thus, one may specify, for example, that spreading factor 8 is always used when WH-spreading is used. Use of WH-2 implies that two blocks of four sub-carriers are interleaved into two separate clusters so that 4+4 neighboring sub-carriers in the two clusters occupy the spreading. Thus, the interference is between the two blocks, and the expected diversity gain is two. Similarly, use of WH-4 implies 2+2+2+2 sub-carriers in four clusters, and use of WH-8 implies 1+1+1+1+ 1+1 +1+1 sub-carriers in eight clusters.

Any selection of modes and coding schemes may be applied in this invention, any number of sets may be selected, and the sets may have any number of elements. In particular, it is possible to design AMC sets based on pure multi-carrier transmissions without frequency spreading. For example, this may be achieved in a straight forward manner by replacing WH-2, WH-4, and WH-8 in FIGS. 6-13 by "single stream" transmission with the corresponding modulation.

In a cellular system, it is possible that a different number of antennas is used in a different cell or sector. The number of transmission antennas per sector may be broadcast to the cell/sector possibly in addition to information relating to whether multiple streaming is preferable or not. Depending on the broadcast information, different embodiments of the invention may be used. For example, if thirty-six TFI/FB bits are available, sixteen characteristic sets from FIGS. 6-13 may be chosen. Based on broadcast information, the interpretation of the thirty-six TFI/FB bits may be different. Similarly, in Uplink (UL), the base stations in the active set may maintain a list of user-specified constant or slowly changing characteristics, which would need to be updated on a slower frequency than the FB bits themselves. Because the majority of TFI/FB overhead does not come from the semantic bits, more complicated implementations may result. It may be preferable to fix the TFI/FB word length to the maximum allowed in any antenna configuration/environment in all cells/sectors and to use only one of the embodiments (for example, the fourth embodiment with thirty-eight bits).

The power allocation weights related to a selection of modes is preferably predefined. If, for example, the AMC set selected has two modes, a ratio of the transmitted power used for a cluster applying the first mode and for a cluster applying the second mode may be defined. Equal power allocation may be used. Alternatively, the power allocation may favor one of the modes. Relative to the transmission capacity, it is preferable to allocate more power to the mode with the higher rate, for example, by allocating equal power per bit to the clusters. Slight improvements in performance may be achieved, if the power allocated to a cluster with a higher rate is even greater than is allocated by equal power per bit. The precise ratios should be predefined, based on expected channel conditions. Alternatively, a few different (e.g two) power allocation ratios may be selected for a transmission mode. As a result, the different power allocation modes may be different for AMC sets that are chosen using the semantics bits. For example, one AMC set could be single stream QPSK/16-QAM with a power ratio of 1/1 while another set could be single stream QPSK/16-QAM with a power ratio of 3/5.

At a cluster boundary where the used mode changes, it is likely that the reliability jumps if constant power is allocated to all sub-carriers within a cluster. Better performance is achieved if the rate or the power allocation is interpolated at the cluster boundary. Thus, for example, when using subsets 13-15 in FIG. 6, the jump in reliability may be smoothed by using a number of QPSK symbols at a cluster boundary because a jump from 16-QAM to BPSK (or vice versa) is expected. Additional smoothing may be achieved by interpolating the power allocated to sub-carriers at a cluster boundary. For example, subsets 3 and 4 in FIG. 6 at a cluster boundary where the modulation changes from BPSK to QPSK, the power allocated to the sub-carrier(s) in the BPSK cluster close to the jump may be decreased, and the power allocated to the subcarrier(s) in the QPSK cluster close to the jump may be increased.

For TFI (not FB), the sets of possible modes may be extended without additional overhead. To achieve this, blind detection is used to separate the additional mode(s) from the two modes indicated by the sematic bits. Using blind detection, the receiver estimates the mode that was used for transmission. In particular, reliable measurements may be performed to detect whether something is transmitted on a cluster or not. Thus, for example, if subsets 3-10 in FIG. 6 are used, the transmitter may choose not to transmit anything on particularly low-SNR clusters. The receiver blindly detects such clusters and concentrates on detecting the data in clusters with information.

The indicator bits in TFI for such blindly zeroed clusters may be predefined to be a specific combination of indicator bits (for example indicator bits=1), so that not all clusters need to be checked for blind zeroing. Also, it may be specified that the indicator bits for a zeroed cluster always differ from the indicator bits of the previous cluster (or the last cluster, when considering the possible zeroing of the first cluster). If there are more than 2 modes in a set, these two approaches may be combined. Thus, a blindly zeroed cluster could be indicated by indicator bits 01 or 00 so that the indicator bits of the previous cluster would be different. This considerably reduces the candidates to be tested for possible blind zeroing.

The modes discussed here may be interpreted in terms of two-dimensional spreading and multicodes. Thus, the WH-spreading is literally frequency spreading, and the high rate/diversity matrix modulators may be understood as spatial spreading. A "spreading code" then means any multidimensional basis matrix that is used to transmit, for example, a real symbol. In the discussion above, the TFI/FB is formulated so that each mode is used with a 100% load, and it is not possible to share a mode between multiple users. However, it is possible to extend the TFI (and FB) method discussed to include the possibility that multiple users share parts (subsets of "spreading codes") of the same mode. It also is possible to blindly null some "spreading codes" in a mode. Thus, for example, if there is insufficient data to use the modes reserved to a user fully, the transmitter may choose not to use all of the "spreading codes". For this type of operation, it may be agreed beforehand in which order "spreading codes" are nulled. The receiver may blindly detect whether data has been transmitted on a spreading code or not. Thus, it may be agreed that first a specific "spreading code" (real part of a symbol) is removed from the lower rate mode, then a specific "spreading code" (real part of a symbol) from the higher rate mode, etc.

In modes where higher order modulation (16-QAM, 64-QAM) is used, it is beneficial to remove the least reliable bits instead of the entire real part of symbols resulting in a slightly more involved blind rate detection. Thus, it may be agreed that first, the least reliable bit of a specific "spreading code" (real part of a symbol) is removed from the lower rate mode, second, the least reliable bit of a specific "spreading code" (real part of a symbol) is removed from the higher rate mode, third the least reliable bit of another specific "spreading code" (real part of a symbol) is removed from the lower rate mode, etc. Using such a method, the real part of a QPSK symbol is BPSK, and the "least reliable bit" of a BPSK symbol may be interpreted as the symbol itself.

Some semantics bits may be dedicated to indicating the cluster length. The entire FB/TFI word can still be the same length. If the clusters are longer, the redundant bits may be used to improve the reliability of the FB/TFI bits. Because there are often a multitude of logical channels in a cellular system, some clusters may be permanently (or adaptively) dedicated to specific channels. In such a case, the inventive solution may apply to each channel separately, when applicable.

Figure 15:
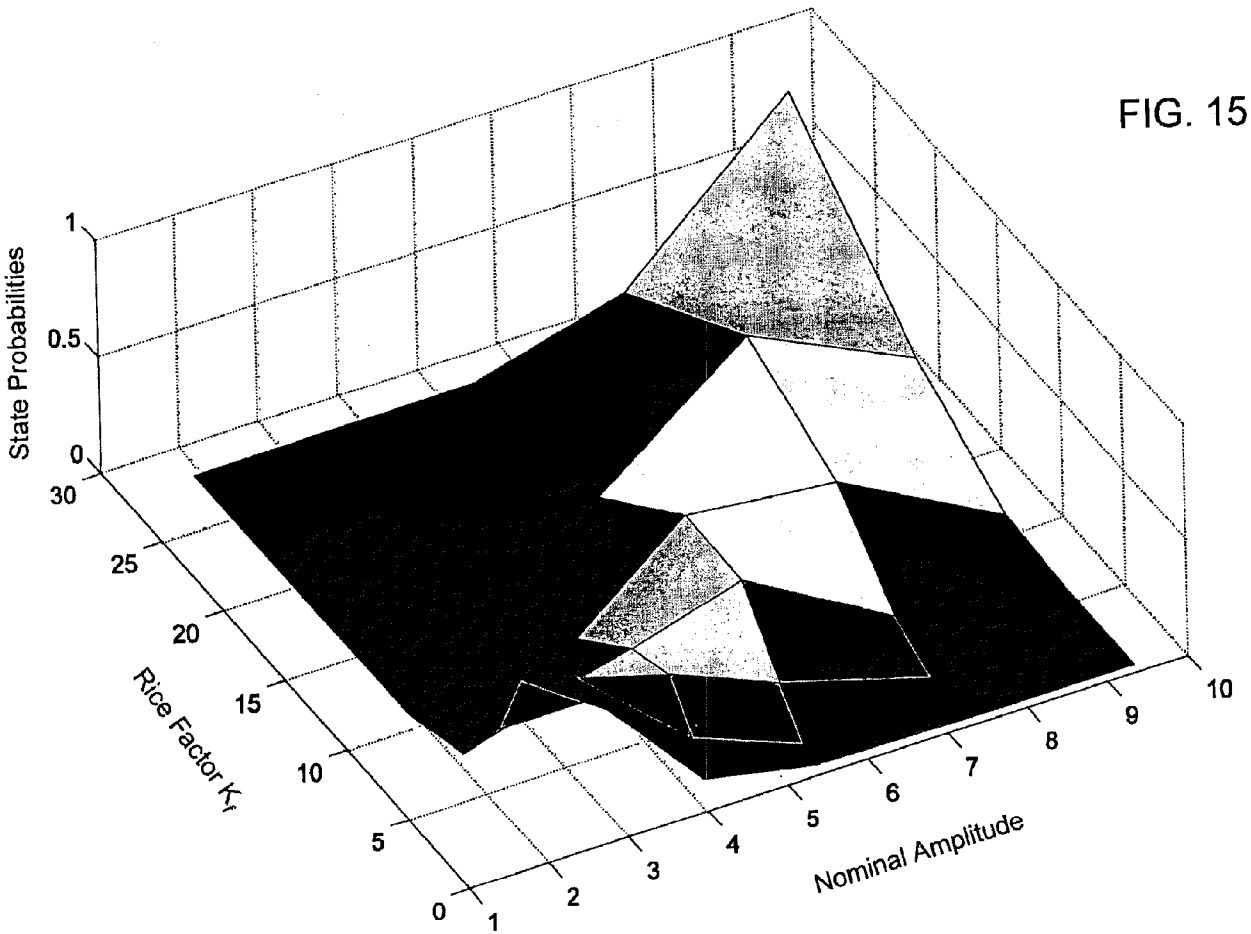
FIG. 15 is a three dimensional graph of state probabilities as a function of a nominal amplitude and rice factor.
Figure 16:
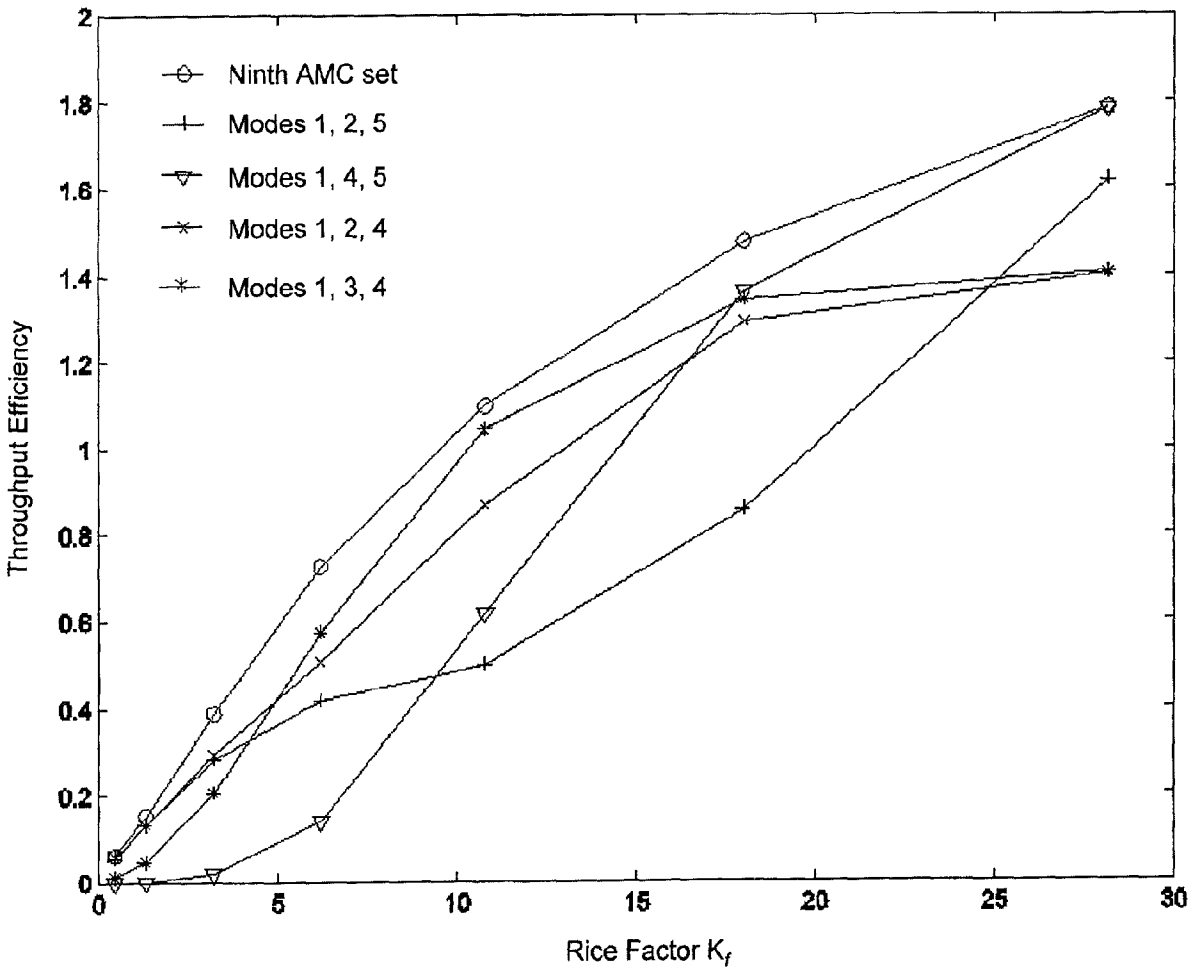
FIG. 16 is a throughput efficiency graph comparing five different adaptive to a fixed mode system.

A ninth exemplary AMC set is tabulated in FIG. 14. The ninth exemplary AMC set includes five transmission modes for selection in a subset. FIG. 15 illustrates a three-dimensional graph of state probabilities as a function of a nominal amplitude and a Rice factor. As the conditions change (Rice factor) the most probable class changes. A system employing AMC can adapt to various conditions which, in some situations, is preferable over a fixed mode system FIG. 16 illustrates the throughput efficiency using a subset (two modes plus no transmission mode) of the five transmission modes of the ninth exemplary AMC set. Good values of the average throughput efficiency are obtained locally in the ideal region (see FIG. 15). The principle of link adaptation, like AMC, is to adapt to the varying conditions. Channel conditions can be evaluated by the signal to interference-plus-noise ratio (SINR), or by any other metric of the signal quality. The adaptation is accomplished by choosing, in the available set, the transmission mode that is the ideal or most suited mode for that condition. Each transmission mode has its best usage in a particular region, i.e., in a particular interval of the quality metric domain. For example, in FIG. 16 it can be observed that the fourth mode (1,3,4) has its ideal region in the mid portion, whereas the second subset (1,4,5) is at its best in the highest portion of the plotted domain. Small losses result outside the ideal region. In this example, a subset of two modes is demonstrated to be effective.

Figure 20:
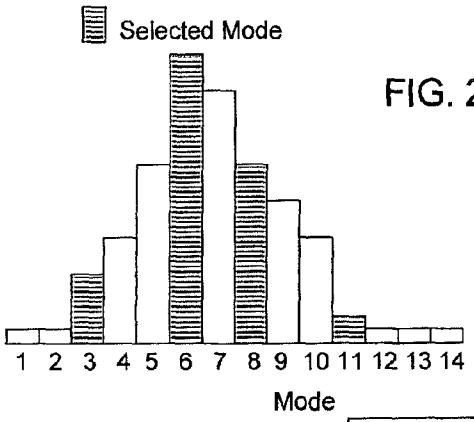
FIG. 20 is a graph depicting mode selection with decimation using an uneven step size.

With reference to FIG. 17, a method for selecting the modes for inclusion in the subset from an AMC set is defined in an exemplary embodiment. In an operation 90, a signal quality is measured at the receiver or at the transmitter if reciprocity is assumed. The information collected is the state probability of the quality metric region associated with each physical layer mode implemented in the system. This statistic is the discrete version of the Probability Density Function (PDF) in the form of a histogram (for example, as shown in FIGS. 18-20). In an operation 92, environment statistics (PDF) of the metric values are collected and updated. In an operation 94, modes in the subset are selected from the "best" M regions according to the selection algorithm (described with reference to FIGS. 18-20). In an operation 96, information describing the selected subset is transmitted to the receiver/transmitter. In an operation 98, a determination of the time to re-calculate the environment statistics is performed. If it is time to re-calculate the statistics, in an operation 100, a signal quality is measured at the receiver/transmitter. In an operation 102, environment statistics (PDF) of the metric values are collected and updated based on the new signal quality. In an operation 104, a determination on whether the newly calculated statistics match the previous statistics is performed to determine if a new subset should be calculated. If the new statistics do not match the old statistics, a new transmission mode subset is selected from the "best" M regions according to the selection algorithm testing statistics in an operation 106. In an operation 108, information describing the new selected subset is transmitted to the receiver/transmitter. Also in operation 104, the newly calculated statistics are compared to the current values. If the mismatch between the two is above a certain threshold, the update is performed.

The modes of the subset are ideally selected so that the two extremes of the state probabilities have small, although non-zero values, implying that the dynamics of the entire channel is exploited, and have in the middle region large values, implying that the mode selection is done in a way such that modes that are optimal for most of the time are within the subset. The subset is selected by discarding all of the high rate modes until the mode before the first mode having "non-zero" probability (a threshold must be defined), by discarding all of the low rate modes until the mode after the first mode having "non-zero" probability (a threshold must be defined), and decimating the modes until the desired mode subset size is reached. Either selection with or without decimation may be implemented. In selection without decimation, modes in the subset are contiguous in the implemented subset. With reference to FIG. 18, the transmission mode subset includes modes 5-8. Two possibilities for the information to be sent to the receiver/transmitter include a) a first mode code and a last mode code, and b) a first mode code and a subset size. Without decimation, the entire dynamic of the metric may not be represented or the active set size required to cover the metric may be large. A larger active set requires a larger addressing space and hence increased overhead to the adaptation protocol. Each mode is addressed by the use of an identifier or code. It should be noted that the terms "code" and "identifier" have similar meanings in terms of the present application.

FIGS. 19 and 20 depict selection with decimation. Using decimation, modes are not contiguous in the implemented subset. FIG. 19 illustrates an even step size employed in the decimation. Using an even step size, the information sent to the receiver includes, but is not limited to, a first mode code, a step size, and a subset size. FIG. 20 illustrates an uneven step size employed in the decimation. Using an uneven step size, the information sent to the receiver includes, but is not limited to, an explicit list of codes for the modes in the subset (e.g. 3, 6, 8, 11). Because the performance requirement must be maintained, the elimination of one mode implies associating the mode's signal quality metric interval to the lower neighboring, more error resistant, low rate mode.

The subset is defined by sending the mode identifiers as described above based on the selection method. The complexity can be compared based on the binary digits required to send the information. Assuming that $M_i$ modes are implemented in the transceiver and $M_a$ modes are used in the subset, the overhead to signal the AMC set using the different selection methods is

| Selection Method/Information | Overhead |
|---|---|
| Without decimation/first and last mode | $2 \log_2 (M_i)$ |
| Without decimation/first mode and subset size | $\log_2 (M_i) + \log_2 (M_a)$ |
| With decimation/even step size | $<\log_2 (M_i) + 2 \log_2 (M_a)$ |
| With decimation/uneven step size | $M_a \log_2 (M_i)$ |

The mode information is sent each time the set is changed. The number of binary digits required to represent and identify, i.e. code, a mode in the subset is $2 \log_2 (M_a)$. This information is sent with each information unit (i.e., either a packet or a symbol). The code is an address in the AMC set table that is used to obtain the absolute mode identifier.

Design parameters include the subset size that may depend on the dynamic of the metric, the threshold for assessing irrelevancy of a histogram class (i.e., "zero" value), the threshold for the statistics comparison used to assess changes in the statistics and thus when a new subset is needed, and the rate of comparison of the newly calculated statistics. A large dynamic in the metric together with a small $M_a$ may imply more frequent active set updates. The time of recalculating statistics depends on the delay in the feedback link and the signalling speed in addition to environment characteristics.

Figure 2:
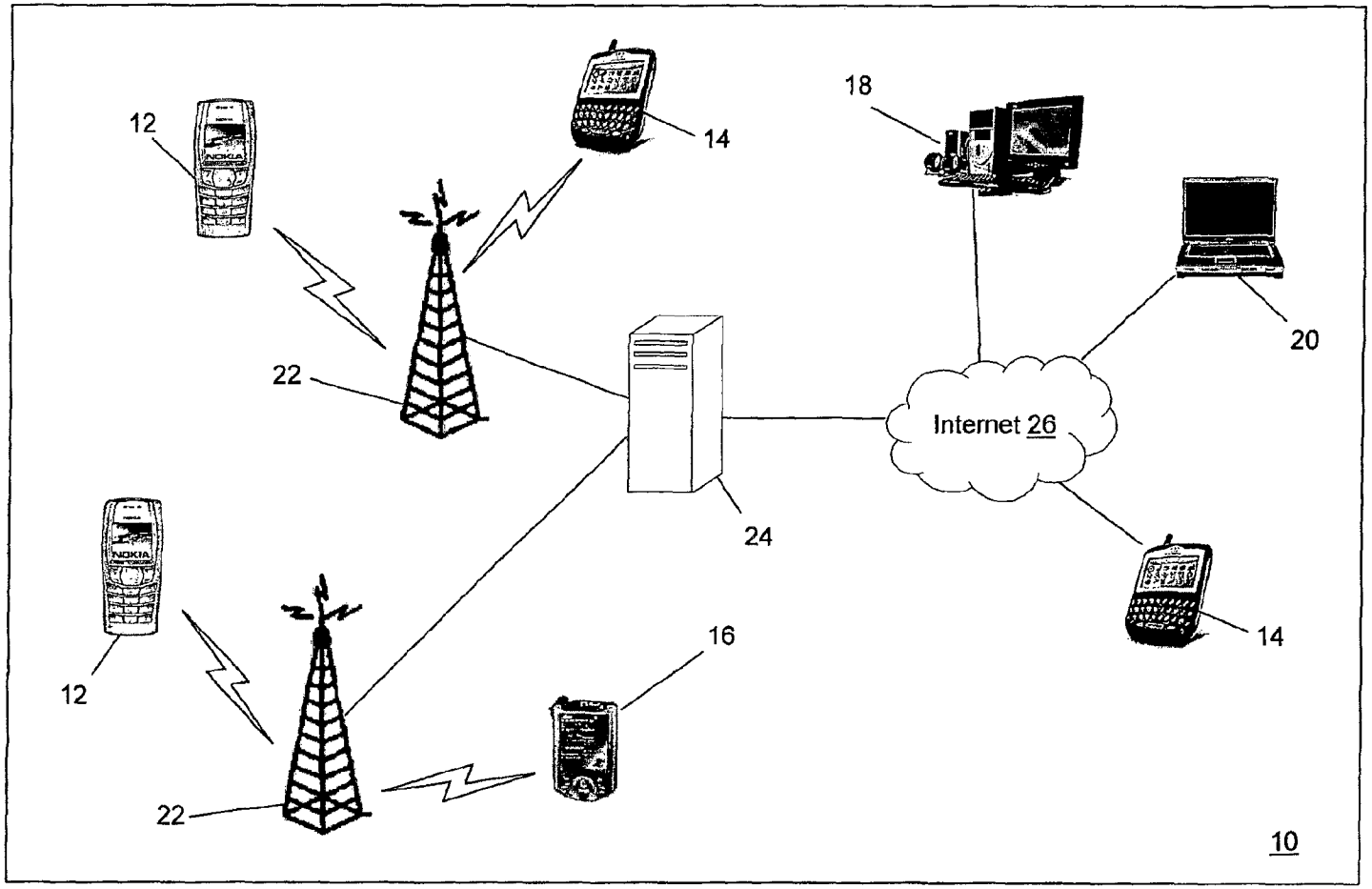
FIG. 2 is an overview diagram of a system in accordance with an exemplary embodiment of the present invention.

With reference to FIG. 2, the system 10 includes, but is not limited to, remote units, a base station 22, and a network server 24. The remote units may include, but are not limited to, a cellular telephone 12, an Integrated Messaging Device 14, a Personal Data Assistant 16, a desktop computer 18, and a notebook computer 20. In the system 10, the devices may send and receive signals through the base station 22. The network server 24 allows communication between the remote units and a broader network. For example, the network server 24 may connect the remote units with other remote units through the Internet 26. The remote units may communicate using various transmission technologies including, but not limited to, OFDM, Code Division Multiple Access (CDMA), Kaiser CDMA, Multi-carrier CDMA, Variable Spreading Factor Orthogonal Frequency and CDMA, Global System for Mobile Communications (GSM), Universal Mobile Telecommunications System (UMTS), Time Division Multiple Access (TDMA), TCP/IP, UDP/IP, Short Messaging Service (SMS), Multimedia Messaging Service (MMS), e-mail, Instant Messaging, IEEE 802.15, IEEE 802.11, IEEE 802.16, etc. The remote units may communicate using various transmission media that may be wired or wireless. The transmission media include, but are not limited to, radio, infrared, laser, optical, USB, Ethernet, IEEE 1394, etc. The system 10 may include any combination of wired or wireless networks including, but not limited to, a cellular telephone network, a WLAN, a Bluetooth PAN, an Ethernet LAN, a token ring LAN, a wide area network, the Internet, etc. The system 10 may include additional devices that include additional base stations 22, network servers 24, remote units, and networks.

Figure 21:
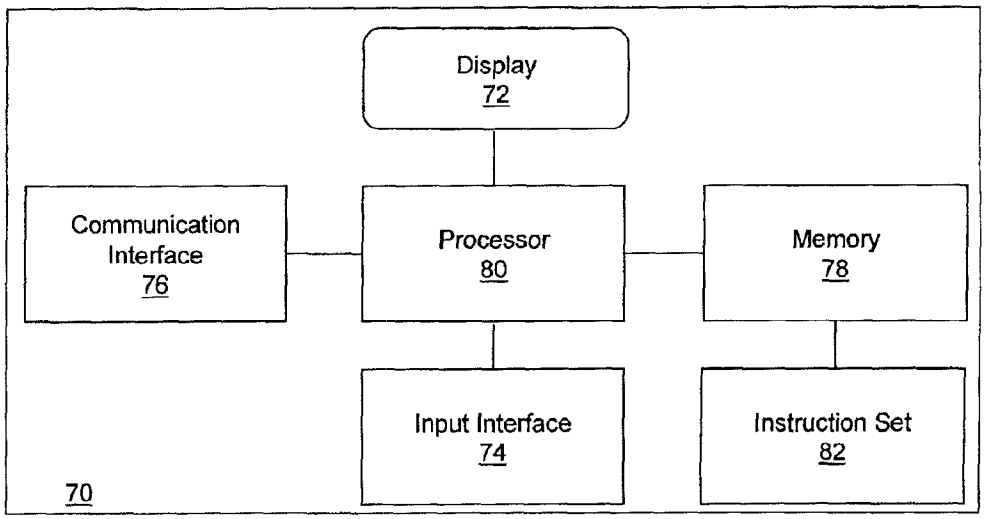
FIG. 21 is a block diagram of a device for performing the operations of FIG. 1 in accordance with an exemplary embodiment of the present invention.

For exemplification, FIG. 21 depicts a block diagram of a device 70 for performing the operations of FIGS. 1 and 17 in accordance with an exemplary embodiment. The device 70 includes, but is not limited to, a display 72, an input interface 74, a communication interface 76, a memory 78, a processor 80, and an instruction set 82 that implements the operations of FIG. 1. Different and additional components may be incorporated into the device 70. The display 72 of the device 70 is optional. The display 72 presents information to a user. The display 72 may be a thin film transistor (TFT) display, a light emitting diode (LED) display, a Liquid Crystal Display (LCD), or any of a variety of different displays known to those skilled in the art now or in the future.

The input interface 74 provides an interface for receiving information from the user for entry into the device 70. The input interface 74 may use various input technologies including, but not limited to, a keyboard, a pen and touch screen, a mouse, a track ball, a touch screen, a keypad, one or more buttons, etc. to allow the user to enter information into the device 70 or to make selections. The input interface 74 may provide both an input and an output interface. For example, a touch screen both allows user input and presents output to the user. The input interface 74 of the device 70 is optional.

The communication interface 76 provides an interface for receiving and transmitting calls, messages, files, and any other information communicable between devices. Communications between the device 70 and other devices may be through one or more of the following connection methods, without limitation: an infrared communications link, a radio frequency communication link, a wireless communications link, a cellular network link, a link established according to TCP/IP, etc. Transferring content to and from the device may be through one or more of these connection methods. The device 70 may communicate using various transmission technologies including, but not limited to, CDMA, GSM, UMTS, TDMA, TCP/IP, Bluetooth, IrDA, RFID, etc. The device 70 may communicate using various media including, but not limited to, radio, infrared, laser, optical, USB, Ethernet, IEEE 1394, etc.

The memory 78 stores the instruction set 82. The device 70 may have one or more memory 78 that uses the same or a different memory technology. Memory technologies include, but are not limited to, Random Access Memory (RAM), Read Only Memory (ROM), flash memory, etc.

The processor 80 executes instructions that cause the device 70 to behave in a predetermined manner. The instructions may be written using one or more programming language, scripting language, assembly language, etc. Additionally, the instructions may be carried out by a special purpose computer, logic circuits, or hardware circuits. Thus, the processor 80 may be implemented in hardware, firmware, software, or any combination of these methods. The term "execution" is the process of running a program or the carrying out of the operation called for by an instruction. The processor 80 executes an instruction, meaning that it performs the operations called for by that instruction. The processor 80 couples to the communication interface 76 to send a signal through the communication interface 76 to a second device. The processor 34 may retrieve a set of instructions from a permanent memory device and copy the instructions in an executable form to a temporary memory device. The temporary memory device is generally some form of RAM.

The instruction set 82 implements the operations of FIGS. 1 and 18 when executed by the processor 80. The instruction set 82 may be written using one or more programming language, assembly language, scripting language, etc.

The described exemplary embodiments are applicable in OFDM systems, filter bank based systems, wavelet based multicarrier systems with or without spreading in time (CDMA) and/or frequency (MC-CDMA, Kaiser MC-CDMA, VSF-OFCDMA, etc.), with or without multiple transmit antennas (at different spatial locations and/or polarizations) and possibly multiple receive antennas (at different spatial locations and/or polarizations). The multiple antennas may be separated by a distance of the order of magnitude of the system wavelength, or a much larger distance, forming a distributed antenna system.

It is understood that the invention is not confined to the particular embodiments set forth herein as illustrative, but embraces all such modifications, combinations, and permutations as come within the scope of the following claims. For example, the present invention is not limited to a particular operating environment. Additionally, the functionality described may be implemented in a single executable or application or may be distributed among modules or managers that differ in number and distribution of functionality from those described herein without deviating from the spirit of the invention. Additionally, the order of execution of the functions may be changed without deviating from the spirit of the invention. Still further, the transmission modes may be any collections of parameters used to determine a transmission, including at least modulation, coding, spreading, power control, power allocation, quantized parameters for long term or short term adaptive array beam forming, space-time coding or any combination of these. Additionally, although the present invention is primarily described in terms of a base station and a remote unit, the scope of the present invention is not limited to such a topology. For example, a communications system in accordance with the present invention can also comprise transmissions between two or more peer devices. Lastly, several aspects of the present invention are also applicable to more general communication systems such as software defined radios. Thus, the description of the preferred embodiments is for purposes of illustration and not limitation.

What is claimed is:

1. A method comprising:

defining a set including a plurality of transmission modes for a signal;

dividing the set into a plurality of subsets, wherein each of the plurality of subsets includes a plurality of transmission modes;

defining a plurality of signal portions of the signal;

selecting a transmission mode subset from the plurality of subsets for transmission of the signal from a first device to a second device;

for each of the plurality of signal portions, selecting a signal portion transmission mode from the plurality of transmission modes of the selected transmission mode subset;

defining semantic bits, the semantic bits including a plurality of bits that indicate the selected transmission mode subset;

defining [an indicator bit] *one or more indicator bit* for each of the plurality of signal portions, the *one or more* indicator bit indicating the selected signal portion transmission mode for the respective signal portion; and transmitting *from the first device to the second device* the semantic bits [and the] *for the selected transmission mode subset; and*

*transmitting from the first device to the second device the one or more* indicator bit for each of the plurality of signal portions [from a first device to a second device;

wherein the semantic bits and the indicator bit for each of the plurality of signal portions specify a transmission mode for each of the plurality of signal portions of the signal].

2. The method of claim 1, wherein the signal comprises a multi-carrier signal.

3. The method of claim 1, wherein the set comprises an adaptive modulation and coding (AMC) set.

4. The method of claim 1, wherein the transmission mode includes transmission parameters and further wherein the transmission parameters are selected from the group consisting of a subset number, a modulation, a constellation, a channel coding option, and an average spectral efficiency.

5. The method of claim 4, wherein the modulation is a modulation method selected from the group consisting of a single stream, a Walsh-Hadamard (WH) spreading two modulation, a WH spreading four modulation, a WH spreading eight modulation, a Space-Time Transmit Diversity (STTD) modulation, a WH spreading two STTD modulation, a diagonal ABBA code modulation, a WH spreading four STTD modulation, a WH spreading two diagonal ABBA code modulation, a two vector modulation, a twist STTD modulation, a WH spreading two twist STTD modulation, a double STTD, a double ABBA code modulation, a three vector modulation, a triple ABBA code modulation, a four vector modulation, and a double twist STTD modulation.

6. The method of claim 4, wherein the constellation is selected from the group consisting of a binary phase shift keying constellation, a quadrature phase shift keying constellation, a sixteen Quadrature Amplitude Modulation (QAM) constellation, and a sixty-four QAM constellation.

7. The method of claim 4, wherein the channel coding option is a code selected from the group consisting of a turbo code and a zig-zag code.

8. The method of claim 7, wherein the turbo code has an effective rate selected from the group consisting of $1/5$ and $1/3$.

9. The method of claim 7, wherein the zig-zag code has an effective rate selected from the group consisting of $1/2$, $2/3$, $3/4$, and $4/5$.

10. The method of claim 1, wherein the plurality of transmission modes is two transmission modes.

11. The method of claim 1, wherein the first device is a [base station] *mobile device*.

12. The method of claim 11, wherein the semantic bits *for the selected transmission mode subset* and the *one or more* indicator bit for each of the plurality of signal portions are transmitted to the second device in a transmission format indicator field of the signal.

13. The method of claim 12, wherein the transmission format indicator field is a channel header.

14. The method of claim 1, wherein the second device is a base station.

15. The method of claim 14, wherein the semantic bits *for the selected transmission mode subset* and the *one or more* indicator bit for each of the plurality of signal portions are transmitted to the base station in a feedback channel.

16. The method of claim 15, wherein the feedback channel is transmitted continuously.

17. The method of claim 15, wherein the feedback channel is transmitted in packets at a time interval less than a channel coherence time.

18. The method of claim 1, wherein the plurality of signal portions comprise a cluster of adjacent frequencies.

19. The method of claim 1, wherein selecting the transmission mode subset is based on evaluation of a signal to interference plus noise ratio of the signal.

20. The method of claim 1, wherein selecting the transmission mode subset is based on evaluation of a fading characteristic of the signal.

21. The method of claim 1, wherein selecting the signal portion transmission mode is based on evaluation of a signal to interference plus noise ratio of the signal.

22. The method of claim 1, wherein selecting the signal portion transmission mode is based on evaluation of a fading characteristic of the signal.

23. The method of claim 1, wherein defining the AMC set is based on a number of antennas at the first device and a number of antennas at the second device.

[24. The method of claim 1, wherein the indicator bit for each of the plurality of signal portions comprises a plurality of bits.]

25. The method of claim 1, further comprising selecting the plurality of transmission modes for one of the plurality of subsets using environment statistics collected using a measured signal quality.

26. The method of claim 25, wherein selecting the plurality of transmission modes uses decimation.

27. The method of claim 26, wherein an even step size is used.

28. The method of claim 26, wherein an uneven step size is used.

29. The method of claim 25, wherein selecting the plurality of transmission modes is without decimation.

30. One or more *non-transitory* computer-readable media [having one or more computer-readable media] having computer-readable instructions stored thereon that, upon execution by a processor, cause the processor to:

select a transmission mode subset from a plurality of subsets defined for transmission of a signal having a plurality of signal portions, wherein each of the plurality of subsets includes a plurality of transmission modes for the signal;

select a signal portion transmission mode from the plurality of transmission modes of the selected transmission mode subset for each of the plurality of signal portions;

define semantic bits, the semantic bits including a plurality of bits that indicate the selected transmission mode subset; and define [an indicator bit] *one or more indicator bit* for each of the plurality of signal portions, the *one or more* indicator bit indicating the selected signal portion transmission mode for the respective signal portion;

[wherein the semantic bits and the indicator bit for each of the plurality of signal portions are included in a transmission from a first device to a second device to specify a transmission mode for each of the plurality of signal portions of the signal]

*transmitting from a first device to a second device the semantic bits for the selected transmission mode subset; and*

*transmitting from the first device to the second device the one or more indicator bit for each of the plurality of signal portions.*

31. A device comprising:

a communication interface, the communication interface configured to send a signal to a second device;

a computer-readable instruction set, the computer-readable instruction set configured to select a transmission mode subset from a plurality of subsets defined for transmission of a signal having a plurality of signal portions, wherein each of the plurality of subsets includes a plurality of transmission modes for the signal;

select a signal portion transmission mode from the plurality of transmission modes of the selected transmission mode subset for each of the plurality of signal portions;

define semantic bits, the semantic bits including a plurality of bits that indicate the selected transmission mode subset; and define [an indicator bit] *one or more indicator bit* for each of the plurality of signal portions, the *one or more* indicator bit indicating the selected signal portion transmission mode for the respective signal portion;

[wherein the semantic bits and the indicator bit for each of the plurality of signal portions are included in the signal to specify a transmission mode for each of the plurality of signal portions of the signal;]

*transmit from the device to the second device the semantic bits for the selected transmission mode subset; and*

*transmit from the device to the second device the one or more indicator bit for each of the plurality of signal portions;* a memory, wherein the memory stores the computer-readable instruction set; and a processor, the processor coupled to the memory and to the communication interface and configured to execute the computer-readable instruction set.

32. A system comprising:

a first device, the first device comprising a first communication interface, the first communication interface configured to send a signal to a second device;

a computer-readable instruction set, the computer-readable instruction set configured to select a transmission mode subset from a plurality of subsets defined for transmission of the signal having a plurality of signal portions, wherein each of the plurality of subsets includes a plurality of transmission modes for the signal;

select a signal portion transmission mode from the plurality of transmission modes of the selected transmission mode subset for each of the plurality of signal portions;

define semantic bits, the semantic bits including a plurality of bits that indicate the selected transmission mode subset; and define [an indicator bit] *one or more indicator bit* for each of the plurality of signal portions, the *one or more* indicator bit indicating the selected signal portion transmission mode for the respective signal portion;

[wherein the semantic bits and the indicator bit for each of the plurality of signal portions are included in the signal to specify a transmission mode for each of the plurality of signal portions of the signal;]

*transmit from the first device to the second device the semantic bits for the selected transmission mode subset; and*

*transmit from the first device to the second device the one or more indicator bit for each of the plurality of signal portions* a memory, wherein the memory stores the computer-readable instruction set; and a first processor, the first processor coupled to the memory and to the first communication interface and configured to execute the computer-readable instruction set; and the second device comprising a second communication interface, the second communication interface configured to receive the signal from the first device; and a second processor, the second processor coupled to the second communication interface and configured to synchronize communication with the first device using the semantic bits and the *one or more* indicator bit for each of the plurality of signal portions included in the received signal.

* * * * *